United States Patent
Ling et al.

(10) Patent No.: US 12,296,850 B2
(45) Date of Patent: May 13, 2025

(54) RIDE COMFORT IMPROVEMENT IN DIFFERENT TRAFFIC SCENARIOS FOR AUTONOMOUS VEHICLE

(71) Applicant: Motional AD LLC, Boston, MA (US)

(72) Inventors: Felice Ling, Cambridge, MA (US); Eliseo Miranda, Boston, MA (US); Amitai Bin-Nun, Silver Spring, MD (US); Helen Argiroff-Flood, Chicago, IL (US); Cristhian Guillermo Lizarazo Jimenez, Boston, MA (US)

(73) Assignee: Motional AD LLC, Boston, MA (US)

( * ) Notice: Subject to any disclaimer, the term of this patent is extended or adjusted under 35 U.S.C. 154(b) by 113 days.

(21) Appl. No.: 17/731,222

(22) Filed: Apr. 27, 2022

(65) Prior Publication Data

US 2022/0355821 A1 Nov. 10, 2022

Related U.S. Application Data

(60) Provisional application No. 63/180,651, filed on Apr. 27, 2021.

(51) Int. Cl.
*B60W 60/00* (2020.01)
*B60W 30/095* (2012.01)
(Continued)

(52) U.S. Cl.
CPC .... *B60W 60/0013* (2020.02); *B60W 30/0956* (2013.01); *B60W 30/143* (2013.01);
(Continued)

(58) Field of Classification Search
CPC ......... B60W 60/0013; B60W 30/0956; B60W 30/143; B60W 30/18163; B60W 40/04;
(Continued)

(56) References Cited

U.S. PATENT DOCUMENTS 6,690,291 B1 * 2/2004 Cardillo ............ B60K 31/0058
340/936
9,645,577 B1 * 5/2017 Frazzoli ............... G05D 1/0212
(Continued)

FOREIGN PATENT DOCUMENTS

DE 102017204393 A1 * 9/2018
DE 102019127975 A1 * 4/2020 ............ H04W 4/12
WO WO 2021/071810 A1 4/2021

OTHER PUBLICATIONS

DE-102019127975-A1 machine translation (Year: 2021).*
(Continued)

*Primary Examiner* — Fadey S. Jabr
*Assistant Examiner* — Mark Robert Heim
(74) *Attorney, Agent, or Firm* — Fish & Richardson P.C.

(57) ABSTRACT

Enclosed are embodiments of motion control operations in various traffic scenarios in consideration of the kinematic factor for trajectory planning. In some embodiments, a method includes: determining a danger rating for at least one object identified in an environment, wherein the danger rating represents a perceived risk associated with a respective object; evaluating a set of hierarchical factors with respect to a traffic scenario, wherein a metric is derived for trajectories of the traffic scenario that quantifies passenger ride comfort based on the danger rating and the set of hierarchical factors; determining a motion control operation in the traffic scenario to increase the passenger ride comfort based on the metric; and augmenting a route planner of an autonomous vehicle with motion control operations in different traffic scenarios to increase the passenger ride comfort.

20 Claims, 32 Drawing Sheets

(51) Int. Cl.
*B60W 30/14* (2006.01)
*B60W 30/18* (2012.01)
*B60W 40/04* (2006.01)

(52) U.S. Cl.
CPC ...... *B60W 30/18163* (2013.01); *B60W 40/04* (2013.01); *B60W 60/0011* (2020.02); *B60W 60/0015* (2020.02); *B60W 2554/20* (2020.02); *B60W 2554/402* (2020.02); *B60W 2554/80* (2020.02); *B60W 2555/60* (2020.02)

(58) Field of Classification Search
CPC ......... B60W 60/0011; B60W 60/0015; B60W 2554/402; B60W 2554/80; B60W 2555/60; B60W 30/18154; B60W 60/0027; B60W 2720/10; B60W 2754/20; B60W 30/10; B60W 2554/20; B60W 30/08; B60W 30/09; B60W 2554/4029; B60W 2554/4023; B60W 2554/4026; G06V 20/56; G06V 20/58–588

See application file for complete search history.

(56) References Cited

U.S. PATENT DOCUMENTS

| | | | | |
|---|---|---|---|---|
| 10,029,685 B1* | 7/2018 | Hubbard | ............ | B60W 30/146 |
| 10,872,379 B1* | 12/2020 | Nepomuceno | ....... | G08G 1/0129 |
| 11,377,120 B1* | 7/2022 | Deng | ................ | B60W 30/0956 |
| 11,524,697 B2* | 12/2022 | Tatourian | .......... | B60W 30/0956 |
| 2009/0002193 A1* | 1/2009 | Cemper | .......... | G08G 1/096783 340/901 |
| 2010/0060441 A1* | 3/2010 | Iwamoto | ............... | B60W 50/14 340/435 |
| 2012/0083942 A1* | 4/2012 | Gunaratne | ............ | B60W 40/09 703/2 |
| 2012/0166042 A1* | 6/2012 | Kokido | .................. | B60Q 5/008 701/36 |
| 2016/0035222 A1* | 2/2016 | Mikuni | ................ | G08G 1/0137 701/117 |
| 2016/0082978 A1* | 3/2016 | Ozaki | .................... | G01C 21/34 701/58 |
| 2016/0288789 A1* | 10/2016 | Durgin | ................ | B60W 30/143 |
| 2017/0032677 A1* | 2/2017 | Seo | ........................ | B60Q 9/008 |
| 2017/0101093 A1* | 4/2017 | Barfield, Jr. | ........ | G08G 1/09675 |
| 2017/0123419 A1* | 5/2017 | Levinson | ............. | G01S 17/931 |
| 2017/0277194 A1* | 9/2017 | Frazzoli | ............ | B60W 30/09 |
| 2018/0059672 A1* | 3/2018 | Li | ..................... | B60W 60/0016 |
| 2018/0356819 A1* | 12/2018 | Mahabadi | ............. | B60W 30/00 |
| 2018/0362028 A1* | 12/2018 | Prokhorov | ......... | B62D 15/0255 |
| 2019/0005726 A1* | 1/2019 | Nakano | ................ | G06T 19/006 |
| 2019/0113927 A1* | 4/2019 | England | ................ | G06F 16/285 |
| 2019/0171215 A1* | 6/2019 | Tatourian | ............. | G06V 40/103 |
| 2019/0221115 A1* | 7/2019 | Masuike | .................. | G08G 1/07 |
| 2019/0232958 A1* | 8/2019 | Deng | ........................ | B60T 7/22 |
| 2019/0381999 A1* | 12/2019 | Yu | ....................... | B60W 60/0015 |
| 2020/0064851 A1* | 2/2020 | Wilkinson | .............. | G06V 20/58 |
| 2020/0139959 A1* | 5/2020 | Akella | ............... | G01C 21/3881 |
| 2020/0164895 A1* | 5/2020 | Boss | .................. | B60W 60/0053 |
| 2020/0174490 A1* | 6/2020 | Ogale | ..................... | G06N 3/084 |
| 2020/0198657 A1* | 6/2020 | Manderla | .............. | B60W 40/13 |
| 2020/0218267 A1* | 7/2020 | Freienstein | .......... | B60W 30/085 |
| 2020/0284872 A1* | 9/2020 | Fix | ......................... | B60W 50/14 |
| 2020/0307589 A1* | 10/2020 | Li | ...................... | B60W 60/0023 |
| 2020/0326712 A1* | 10/2020 | Tang | ...................... | G06V 20/64 |
| 2021/0031763 A1* | 2/2021 | Takaki | .................... | G06V 20/58 |
| 2021/0107513 A1* | 4/2021 | Goto | ..................... | B60W 30/09 |
| 2021/0107522 A1* | 4/2021 | Goto | ................. | B60W 30/0956 |
| 2021/0108936 A1* | 4/2021 | Seegmiller | ...... | B60W 60/00276 |
| 2021/0110484 A1* | 4/2021 | Shalev-Shwartz | .... | B60W 30/09 |
| 2021/0129866 A1* | 5/2021 | Yaskevich | ......... | B60W 30/0956 |
| 2021/0192234 A1* | 6/2021 | Chen | .................... | B60W 60/001 |
| 2021/0204188 A1* | 7/2021 | Oyama | ............... | H04W 84/005 |
| 2021/0309248 A1* | 10/2021 | Choe | ......................... | G06N 3/04 |
| 2022/0063664 A1* | 3/2022 | Liu | .......................... | B60W 10/18 |
| 2022/0223047 A1* | 7/2022 | Pueschl | ............... | G06F 11/3616 |
| 2023/0041319 A1* | 2/2023 | You | ........................ | G08G 1/052 |
| 2023/0174105 A1* | 6/2023 | Zhou | ..................... | B60W 40/04 701/23 |
| 2024/0017742 A1* | 1/2024 | Funai | .............. | B60W 30/18163 |
| 2024/0034316 A1* | 2/2024 | Deschamps | ......... | B60W 30/146 |

OTHER PUBLICATIONS

DE102017204393A1 machine translation (Year: 2018).*
International Preliminary Report on Patentability in International Appln. No. PCT/US2022/026565, dated Nov. 9, 2023, 7 pages.
[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
Gao et al., "VectorNet: Encoding HD Maps and Agent Dynamics from Vectorized Representation," CoRR, submitted May 8, 2020, arXiv:2005.04259, 9 pages.
He et al., "Deep Residual Learning for Image Recognition," Proceedings of the IEEE Conference on Computer Vision and Pattern Recognition (CVPR), 2016, pp. 770-778.
International Search Report and Written Opinion in International Appln. No. PCT/US2022/026565, dated Aug. 26, 2022, 9 pages.
Shah et al., "Stochastically Transitive Models for Pairwise Comparisons: Statistical and Computational Issues," Proceedings of the 33rd International Conference on Machine Learning, New York, NY, USA, Jun. 19-24, 2016; PMLR, 2016, 48:11-20.
Simonyan et al., "Very Deep Convolutional Networks for Large-Scale Image Recognition," CoRR, submitted Sep. 4, 2014, arXiv:1409. 1556, 10 pages.
Extended European Search Report in European Appln. No. 22796654. 6, mailed on Feb. 21, 2025, 10 pages.

* cited by examiner

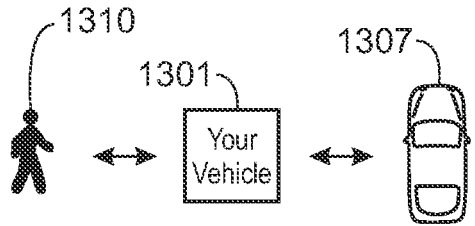

56% Prefer Sticking Slightly
Closer to the Vehicle

FIG. 13H

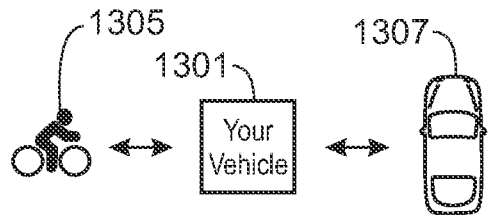

52% Prefer Sticking Slightly
Closer to the Vehicle

FIG. 13I

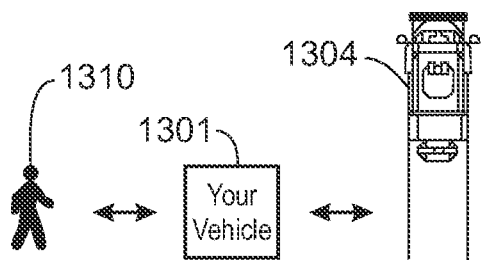

56% Prefer Sticking Slightly
Closer to the Vehicle

43% Prefer Sticking Slightly
Closer to the Truck

43% Feel Most Uncomfortable being
Close to the Bicyclist

43% Feel Most Uncomfortable being
Close to the Truck

FIG. 13J

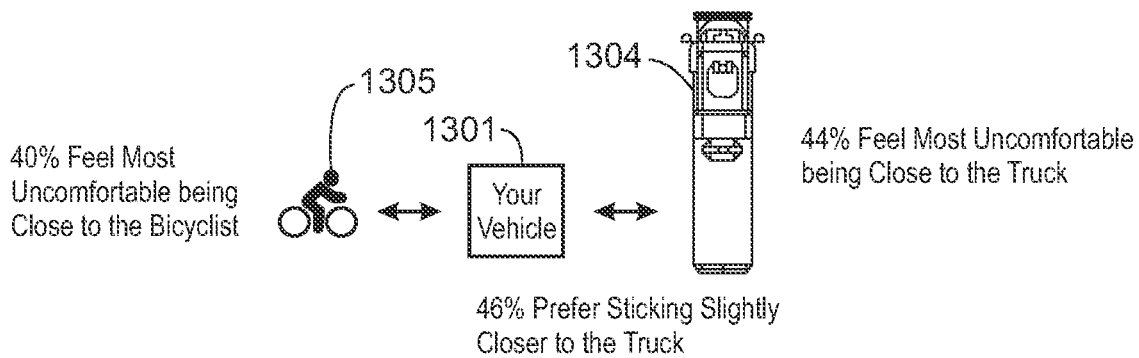

40% Feel Most
Uncomfortable being
Close to the Bicyclist

44% Feel Most Uncomfortable
being Close to the Truck

46% Prefer Sticking Slightly
Closer to the Truck

FIG. 13K

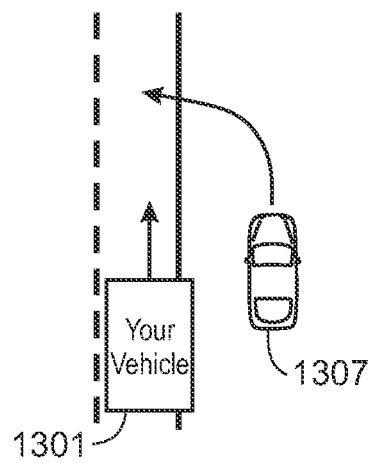
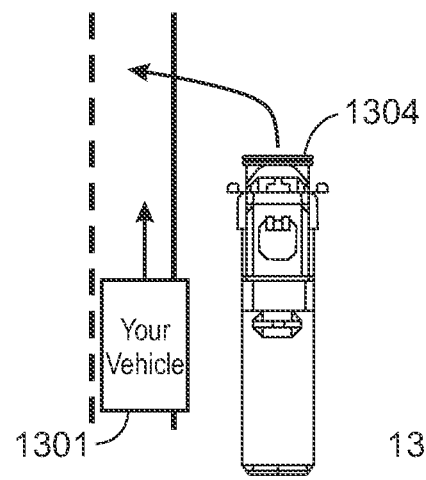
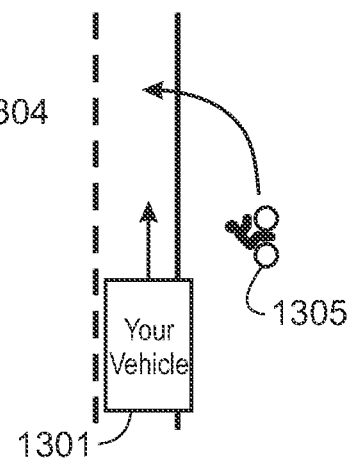
| 65% Prefer to Slow Down | 54% Prefer to Slow Down | 54% Prefer to Slow Down |
22% Prefer to Speed Up
36% Prefer to Speed Up
35% Prefer to Speed Up
54% Find Maintaining Vehicle Speed to be Least Comfortable
64% Find Maintaining Vehicle Speed to be Least Comfortable
57% Find Maintaining Vehicle Speed to be Least Comfortable
FIG. 16A
FIG. 16B
FIG. 16C

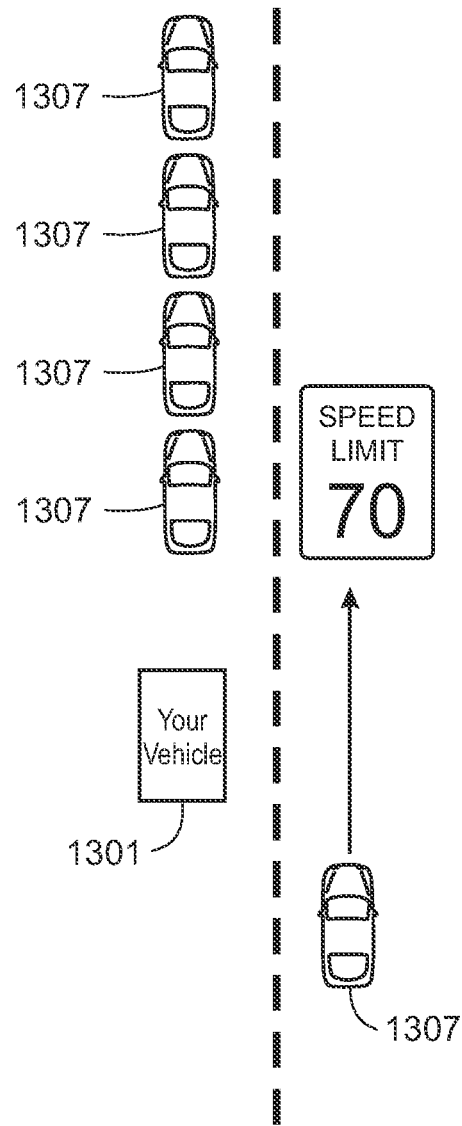
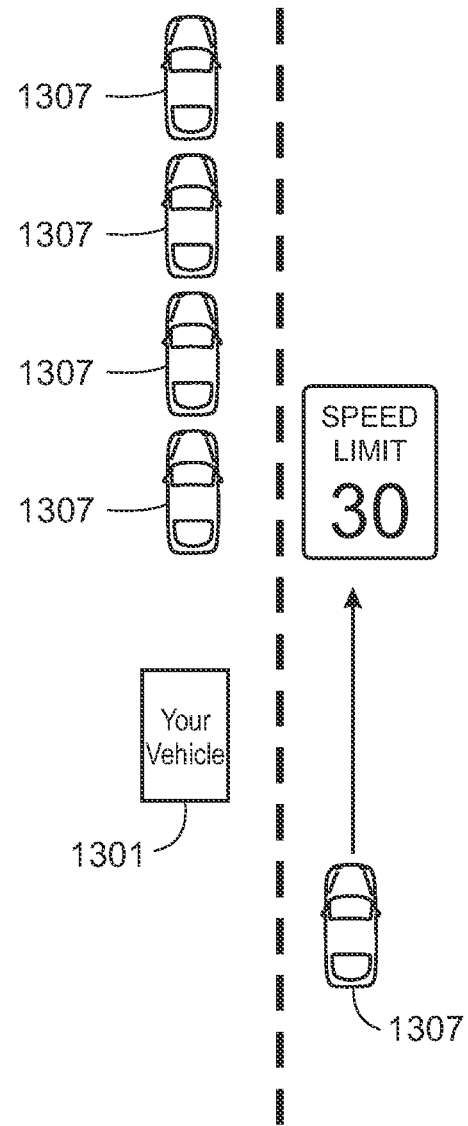
FIG. 23A
FIG. 23B

RIDE COMFORT IMPROVEMENT IN DIFFERENT TRAFFIC SCENARIOS FOR AUTONOMOUS VEHICLE

CROSS-REFERENCE TO RELATED APPLICATION

This application claims priority to U.S. Provisional Patent Application No. 63/180,651 filed Apr. 27, 2021, the entire content of which is incorporated herein by reference.

TECHNICAL FIELD

This disclosure relates generally to planning trajectories in different traffic scenarios for an autonomous vehicle to increase ride comfort.

BACKGROUND

An autonomous vehicle (AV) software stack may plan one or more trajectories that comply with a set of rules embodied in a rulebook. Different AV software stacks can generate different trajectories, each of which complies with the rulebook, but have competing interests, values, or outcomes, e.g., with regard to ride comfort.

BRIEF DESCRIPTION OF THE FIGURES

FIG. 13A-13K are schematic diagrams illustrating various traffic scenarios regarding lateral clearance in accordance with embodiments;

FIGS. 16A-16C are schematic diagrams illustrating various traffic scenarios regarding longitudinal acceleration versus longitudinal deceleration options in accordance with embodiments;

FIGS. 23A-23B are schematic diagrams illustrating a traffic scenario regarding longitudinal jerk versus lateral acceleration in accordance with embodiments;

DETAILED DESCRIPTION

Figure 1:
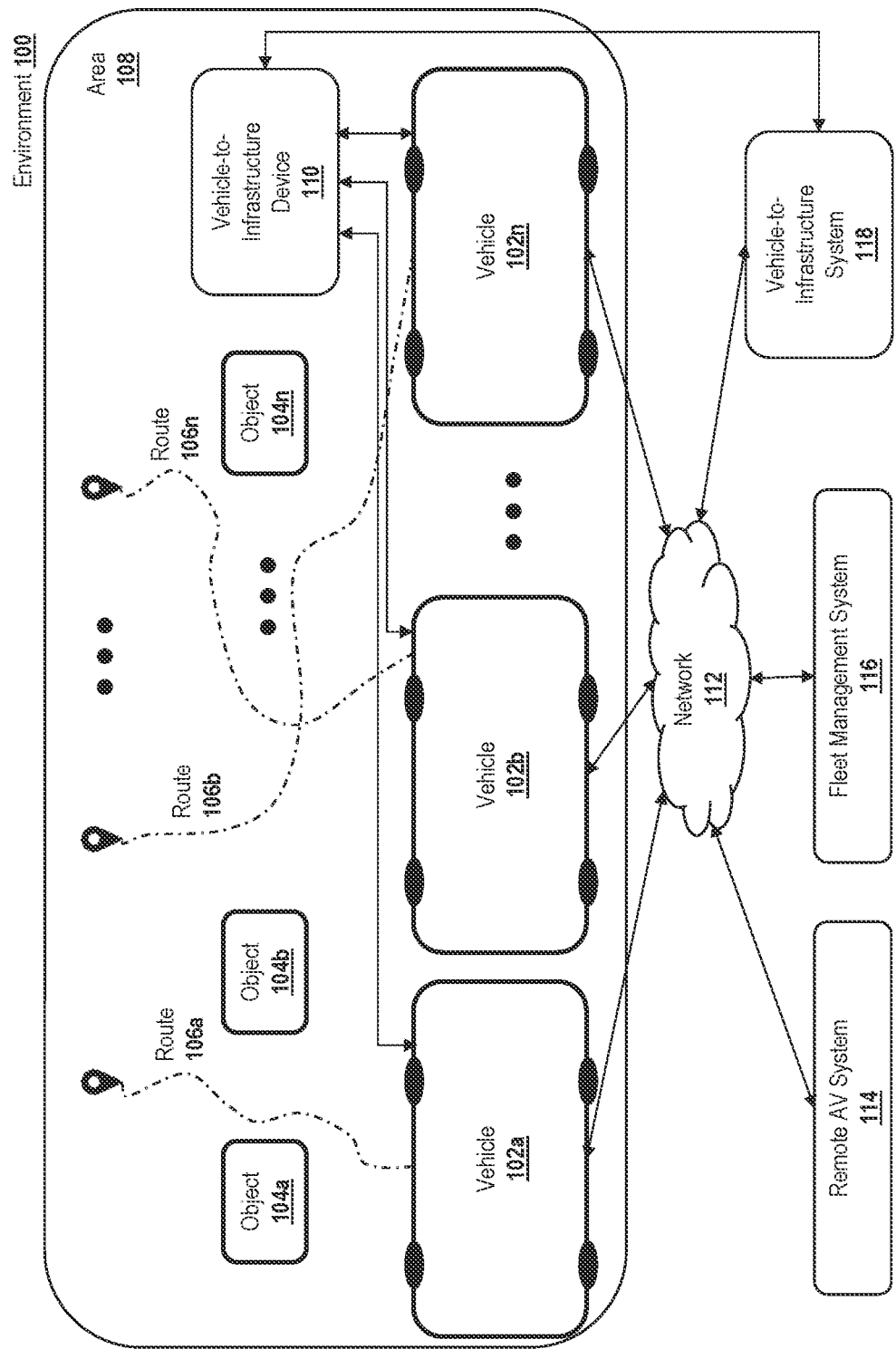
FIG. 1 is an example environment in which a vehicle including one or more components of an autonomous system can be implemented.

In the following description, numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an," and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement systems, apparatuses, methods, and computer program products for factor prioritization in comfort analytics for autonomous vehicles.

By virtue of the implementation of systems, methods, and computer program products described herein, techniques for factor prioritization in comfort analytics for autonomous vehicles rank a set of kinematic factors, based on each factor's impact on passenger comfort and quantify these factors (e.g., by comparison against empirical or human-adopted baselines for each factor).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to the autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked up by the AV, and the second state or region includes a location or locations at which the individual or individuals picked up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls the operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
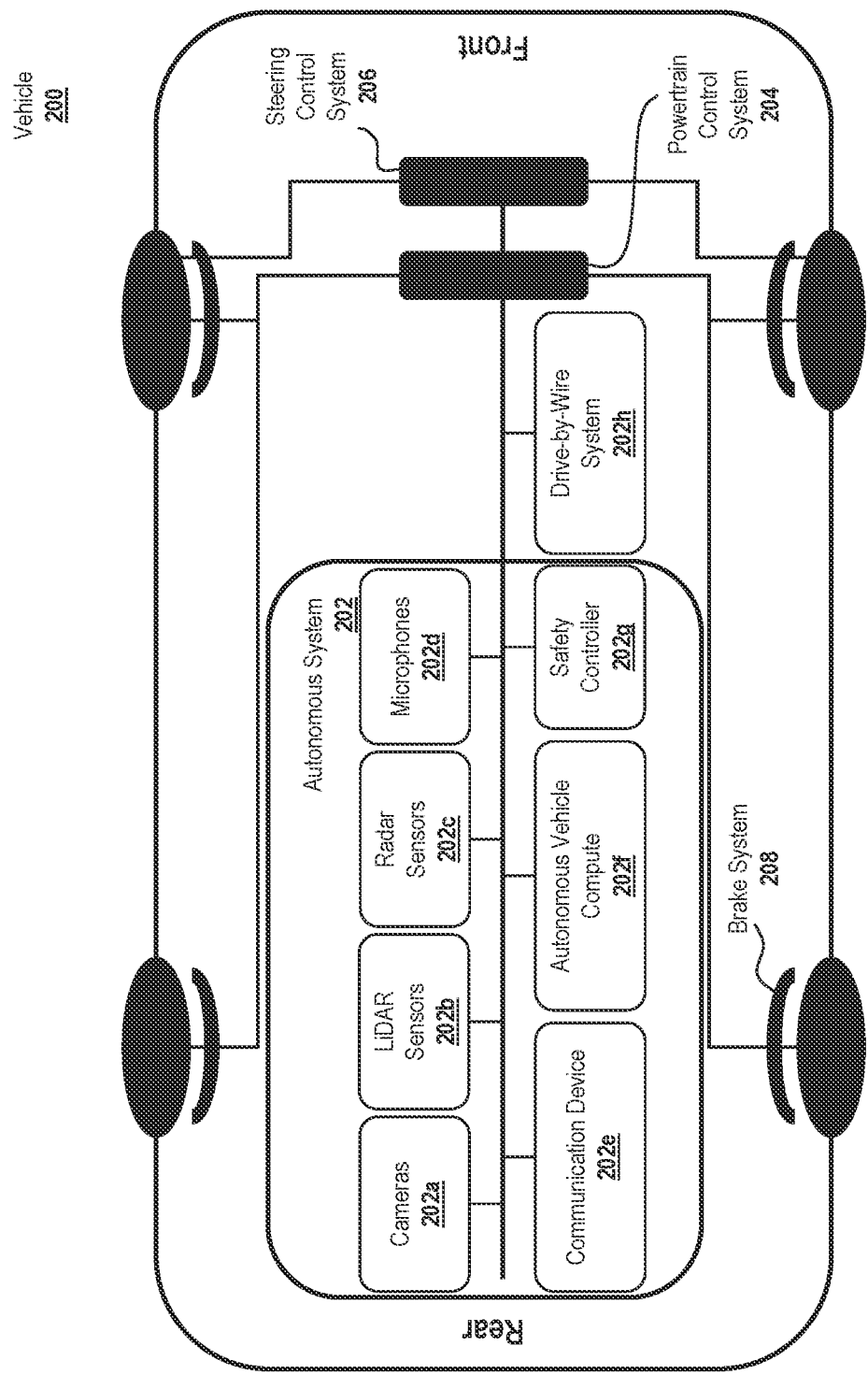
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202$a$, LiDAR sensors 202$b$, radar sensors 202$c$, and microphones 202$d$. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202$e$, autonomous vehicle compute 202$f$, and drive-by-wire (DBW) system 202$h$.

Figure 3:
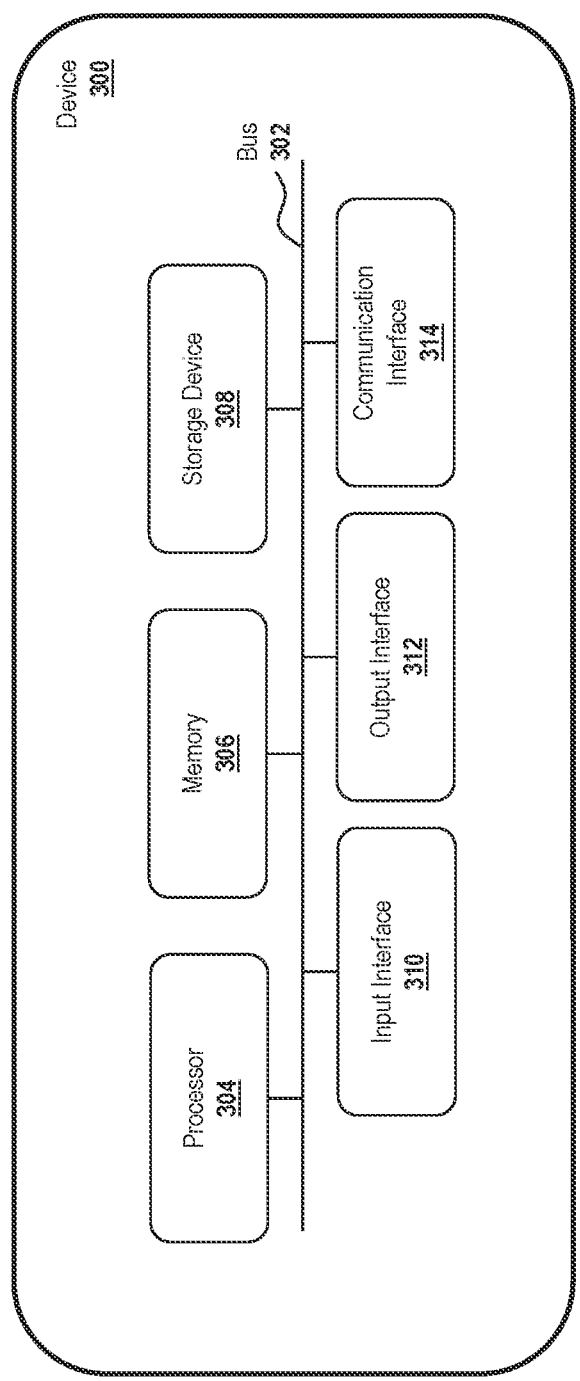
FIG. 3 is a diagram of components of one or more devices and/or one or more systems of FIGS. 1 and 2.

Cameras 202$a$ include at least one device configured to be in communication with communication device 202$e$, autonomous vehicle compute 202$f$, and/or safety controller 202$g$ via a bus (e.g., a bus that is the same as or similar to bus 302 of FIG. 3). Cameras 202$a$ include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202$a$ generates camera data as output. In some examples, camera 202$a$ generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202$a$ includes a plurality of independent cameras configured on (e.g., positioned on) a vehicle to capture images for the purpose of stereopsis (stereo vision). In some examples, camera 202$a$ includes a plurality of cameras that generate image data and transmit the image data to autonomous vehicle compute 202$f$ and/or a fleet management system (e.g., a fleet management system that is the same as or similar to fleet management system 116 of FIG. 1). In such an example, autonomous vehicle compute 202$f$ determines depth to one or more objects in a field of view of at least two cameras of the plurality of cameras based on the image data from the at least two cameras. In some embodiments, cameras 202$a$ is configured to capture images of objects within a distance from cameras 202$a$ (e.g., up to 100 meters, up to a kilometer, and/or the like). Accordingly, cameras 202$a$ include features such as sensors and lenses that are optimized for perceiving objects that are at one or more distances from cameras 202$a$.

In an embodiment, camera 202$a$ includes at least one camera configured to capture one or more images associated with one or more traffic lights, street signs, and/or other physical objects that provide visual navigation information. In some embodiments, camera 202$a$ generates traffic light data associated with one or more images. In some examples, camera 202$a$ generates TLD data associated with one or more images that include a format (e.g., RAW, JPEG, PNG, and/or the like). In some embodiments, camera 202$a$ that generates TLD data differs from other systems described herein incorporating cameras in that camera 202$a$ can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202$b$ include at least one device configured to be in communication with communication device 202$e$, autonomous vehicle compute 202$f$, and/or safety controller 202$g$ via a bus (e.g., a bus that is the same as or similar to bus 302 of FIG. 3). LiDAR sensors 202$b$ include a system configured to transmit light from a light emitter (e.g., a laser transmitter). Light emitted by LiDAR sensors 202$b$ includes light (e.g., infrared light and/or the like) that is outside of the visible spectrum. In some embodiments, during operation, light emitted by LiDAR sensors 202$b$ encounters a physical object (e.g., a vehicle) and is reflected back to LiDAR sensors 202$b$. In some embodiments, the light emitted by LiDAR sensors 202$b$ does not penetrate the physical objects that the light encounters. LiDAR sensors 202$b$ also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments, autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples, brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments, input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above), and planning system 404 updates the at least one trajectory or generates at least one different trajectory based on the data generated by perception system 402. In some embodiments, planning system 404 receives data associated with an updated position of a vehicle (e.g., vehicles 102) from localization system 406, and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors, and localization system 406 generates a combined point cloud based on each of the point clouds. In these examples, localization system 406 compares the at least one point cloud or the combined point cloud to a two-dimensional (2D) and/or a three-dimensional (3D) map of the area stored in database 410. Localization system 406 then determines the position of the vehicle in the area based on localization system 406, comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area, and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404, and control system 408 controls the operation of the vehicle. In some examples, control system 408 receives data associated with at least one trajectory from planning system 404, and control system 408 controls the operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
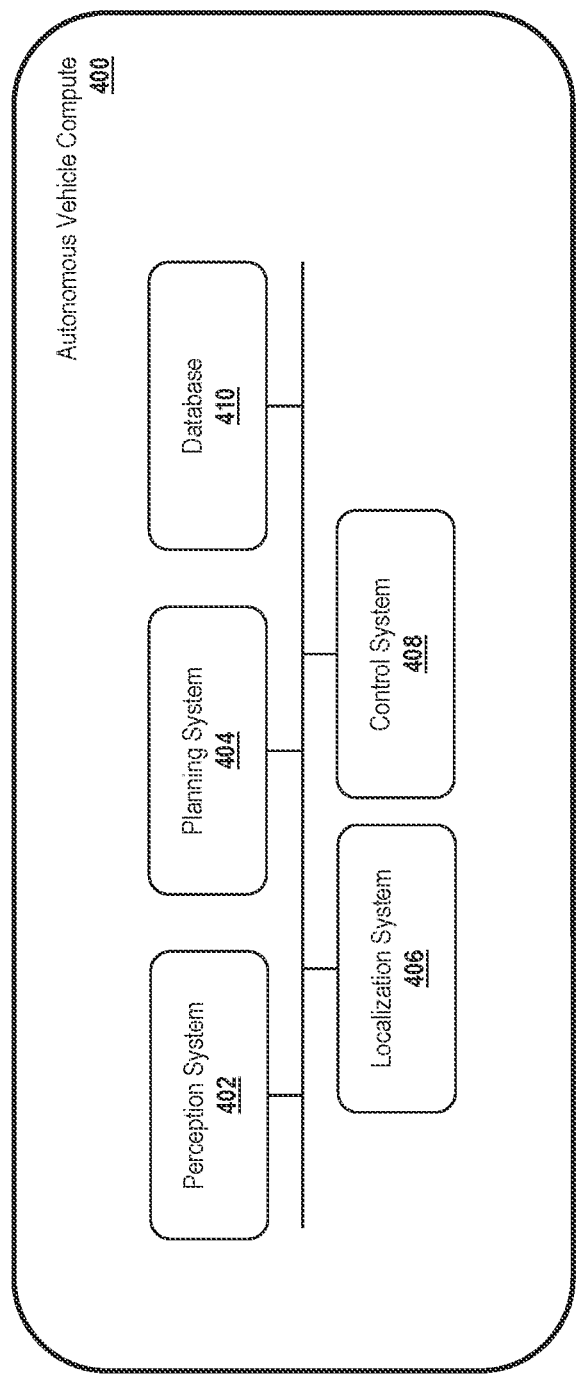
FIG. 4A is a diagram of certain components of an autonomous system.
Figure 4B:
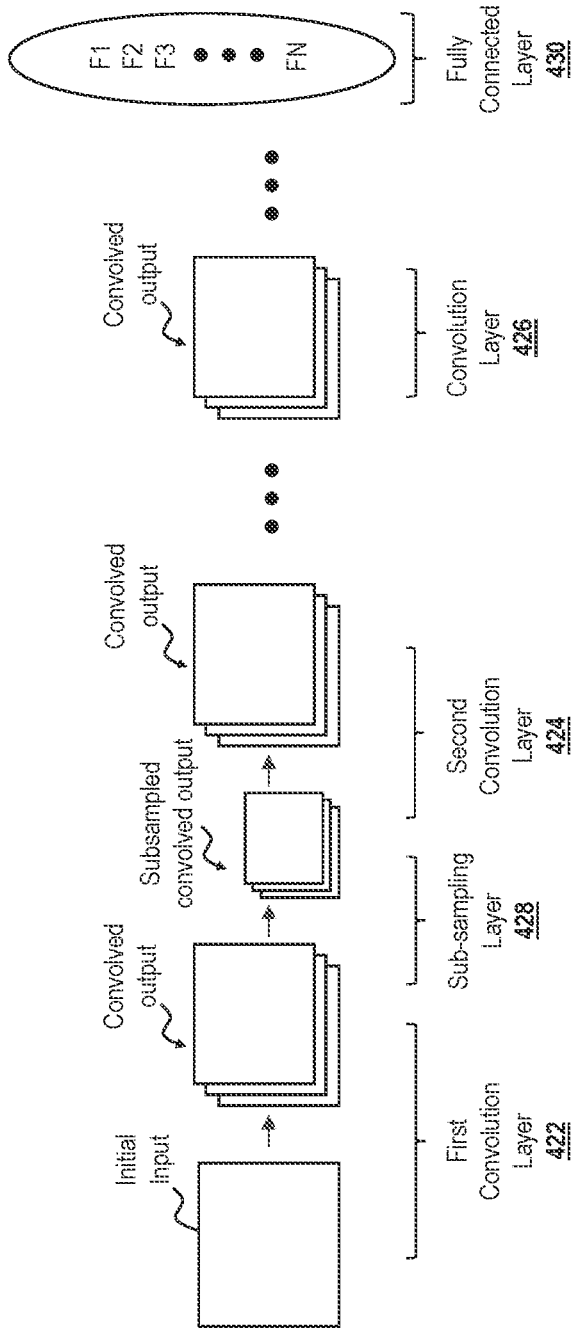
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples, CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., a number of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422, and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments, perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
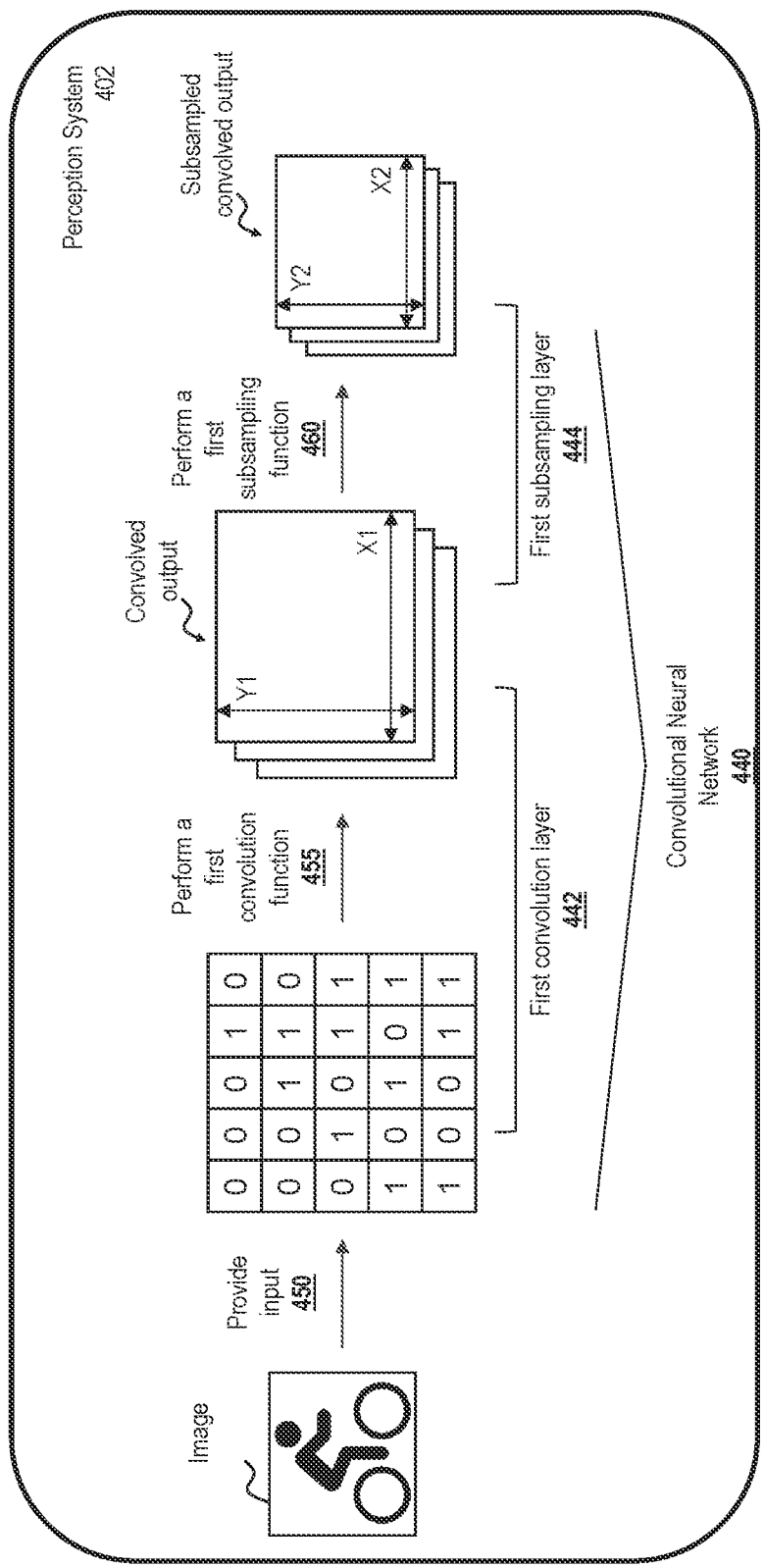
FIGS. 4C and 4D are a diagram illustrating example operation of a CNN.
Figure 4D:
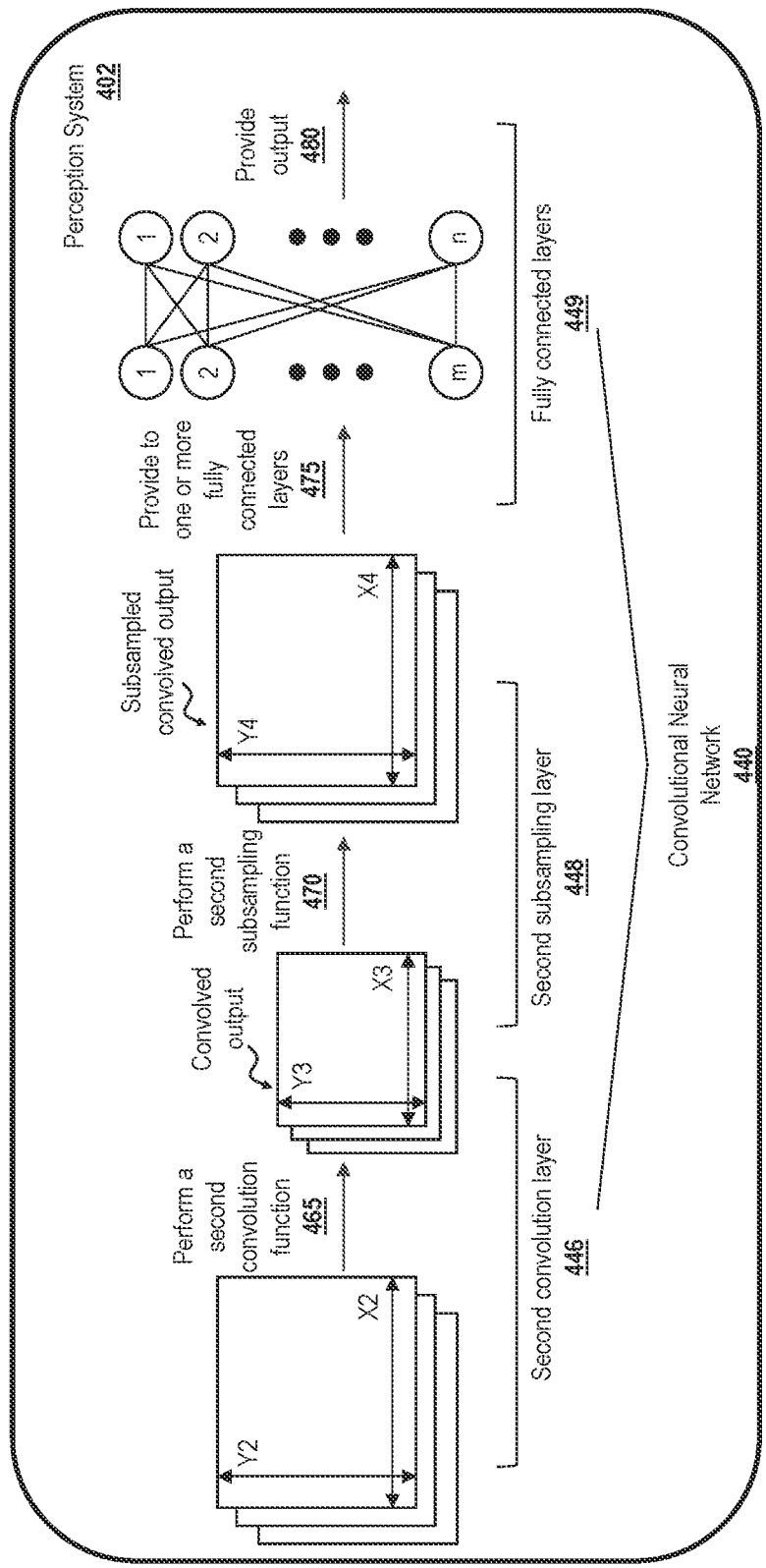

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in the first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of the first convolution layer 442 is referred to as a convolved output. In some embodiments, where each neuron has the same filter, the convolved output is referred to as a feature map.

In some embodiments, CNN 440 provides the outputs of each neuron of the first convolutional layer 442 to neurons of a downstream layer. For purposes of clarity, an upstream layer can be a layer that transmits data to a different layer (referred to as a downstream layer). For example, CNN 440 can provide the outputs of each neuron of the first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of the first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in the second convolution layer 446. In some embodiments, each neuron of the second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of the first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of the second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of the second subsampling layer 448.

At step 475, CNN 440 provides the output of each neuron of second subsampling layer 448 to fully connected layers 449. For example, CNN 440 provides the output of each neuron of the second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

An AV can traverse a given traffic scenario in different ways. Different AV route planners can choose different trajectories as the preferred way to traverse the traffic scenario. It is desired, however, to choose the "best" trajectory for an AV to traverse the traffic scenario, which can include considering the comfort of the passenger(s) in addition to other considerations, such as safety, lawfulness, etc. In examples, a best trajectory can be subjective. Additionally, in examples a best trajectory is one that at least enables the AV to adhere to traffic laws, be comfortable, ethical, etc. The embodiments described herein use a machine learning (ML) model to predict reasonableness scores for AV trajectories in an interpretable way. In examples, the ML model is the at least one machine learning model described with respect to FIGS. 4A-4D. In an embodiment, the reasonableness scores are real numbers, and the higher the score, the more reasonable the trajectory. Human annotations inform the parameters of the model. To achieve interpretability, in an embodiment, rulebooks can be used to break down how the AV traverses a traffic scenario into human-understandable components that can be formally analyzed to assign the AV trajectory a reasonableness score. After the ML model is trained, the ML model can then be used during real-time operation of an AV to predict reasonableness scores for two or more trajectories for the AV to traverse the traffic scenario. The scores can be used to decide which trajectory the AV should choose to traverse a given traffic scenario. In this manner, one trajectory can be chosen over another because it is more "reasonable" according to reasonable crowd data.

Traffic Scenarios

Figure 5A:
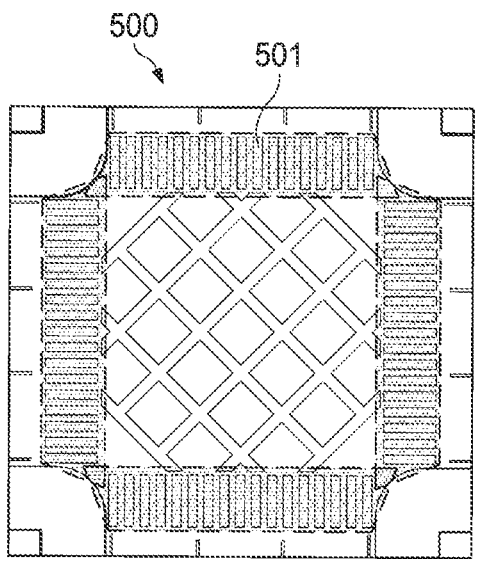
FIG. 5A is a map illustrating a topology that includes a street intersection with lane markings and crosswalks.

In an embodiment, a traffic scenario has the following relevant features:

Map M: a topology of the road network and the static environment (e.g., buildings, road markings). FIG. 5A is a map illustrating a topology that includes a street intersection 500 with lane markings and crosswalks 501.

Figure 5B:
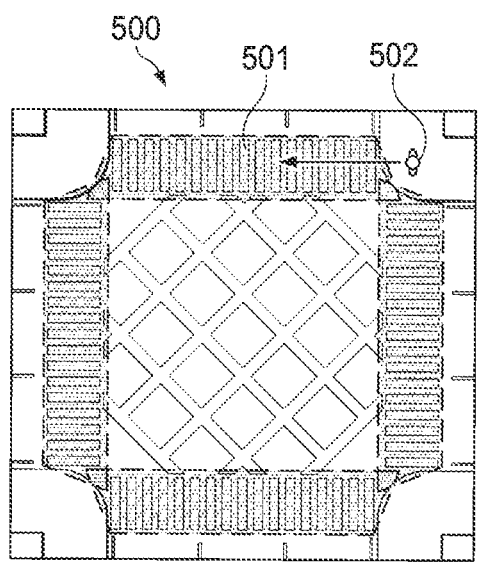
FIG. 5B illustrates an example traffic scenario where an agent (a pedestrian) is about to enter a crosswalk at an intersection.

Scenario b: The background of a traffic scenario, which is a map populated with other agents, their starting position and their trajectories. FIG. 5B illustrates an example traffic scenario where an agent 502 (a pedestrian) is about to enter crosswalk 501 at intersection 500.

Trajectory t: The AV's trajectory in a given traffic scenario.

Figure 5C:
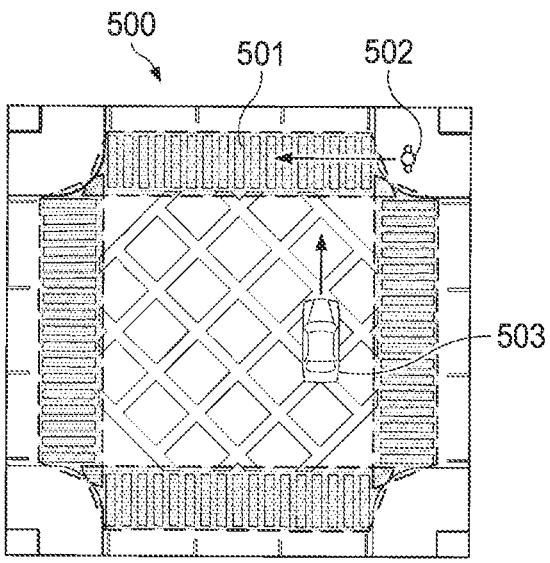
FIG. 5C illustrates an example AV traversing the intersection.

Realization w of scenario b, w∈$W_b$: a realization includes the traffic scenario and the AV's trajectory through it. FIG. 5C illustrates an example AV 503 traversing the intersection 500.

Annotations

Annotated data is needed to train an ML model. In an embodiment, the raw data to be annotated is a collection of traffic scenarios, $$B=\{b_1, \ldots, b_L\} \quad [1]$$

and a set of realizations associated with each of the traffic scenarios, $$W=\{W_{b_1}, \ldots, W_{b_L}\}. \quad [2]$$

Human annotators are then shown a subset of these realizations and asked to rank them. Specifically, a ranking x is a permutation of a collection of realizations W:

$$(w1, \ldots, wm) \rightarrow (\pi(w1), \ldots, \pi(wm)), \quad [3]$$

where m∈$Z^+$ is the number of realizations to be ranked and π(wi) is the rank of realization wi. π serves as the ground-truth data that ML model is trained on. Note that annotators are asked to rank or rate realizations because it is unrealistic to expect a human to provide an absolute score for a particular realization.

Pair-Wise Comparisons

To reduce the cognitive load on the human annotators, in an embodiment, annotators are shown a pair of realizations and asked to choose the realization they think is most reasonable.

Formally, consider a set of m realizations $\{w_1, \ldots, w_m\}$. There are $$\binom{m}{2}$$

ways to pair m realizations. An annotator is shown such a pair on, for example, a computer screen, and asked to choose their preferred realization, such as, for example, the realization that is more reasonable. In an embodiment, the annotator's preference is encoded with the function h:

$$h(w_{i(k)}, w_{j(k)}) = \begin{cases} +1 & \text{if the annotator preferred } w_{i(k)} \text{ over } w_{j(k)} \\ -1 & \text{otherwise} \end{cases}, \quad [4]$$

where $(w_i(k), w_j(k))$ is the kth possible way to pair the m realizations, and i, j are integers between 1 and m. Other functions can be used to encode of the annotator's preference, or the preference can be used directly.

Note that the realization pairs are not constrained to come from the same traffic scenario. To increase data quality, however, the realization pairs can be constrained to come from the same scenario. Further, to account for noisy annotations, and the biases of the annotators, multiple human annotators can be asked to annotate the same pair of realizations $(w_i(k), w_j(k))$. Further, note that given the encoding function h, the ground-truth data $\pi$ can be created by using stochastically transitive models, such as the Bradley-Terry model, described in Nihar B. Shah, Sivaraman Balakrishnan, Adityanand Guntuboyina, and Martin J. Wainwright. Stochastically Transitive Models for Pairwise Comparisons: *Statistical and Computational Issues*, 2015.

The realizations described above can be obtained in different ways. In an embodiment, a human subject sits in a vehicle that traverses the same real traffic situation in different ways. However, this is prohibitively expensive. In an alternative embodiment, a simulator is used that ingests a representation created by hand with a test case editor or created by an algorithm that simulates traffic. The simulator produces three-dimensional (3D) videos that are then shown to the human annotators.

Figure 6:
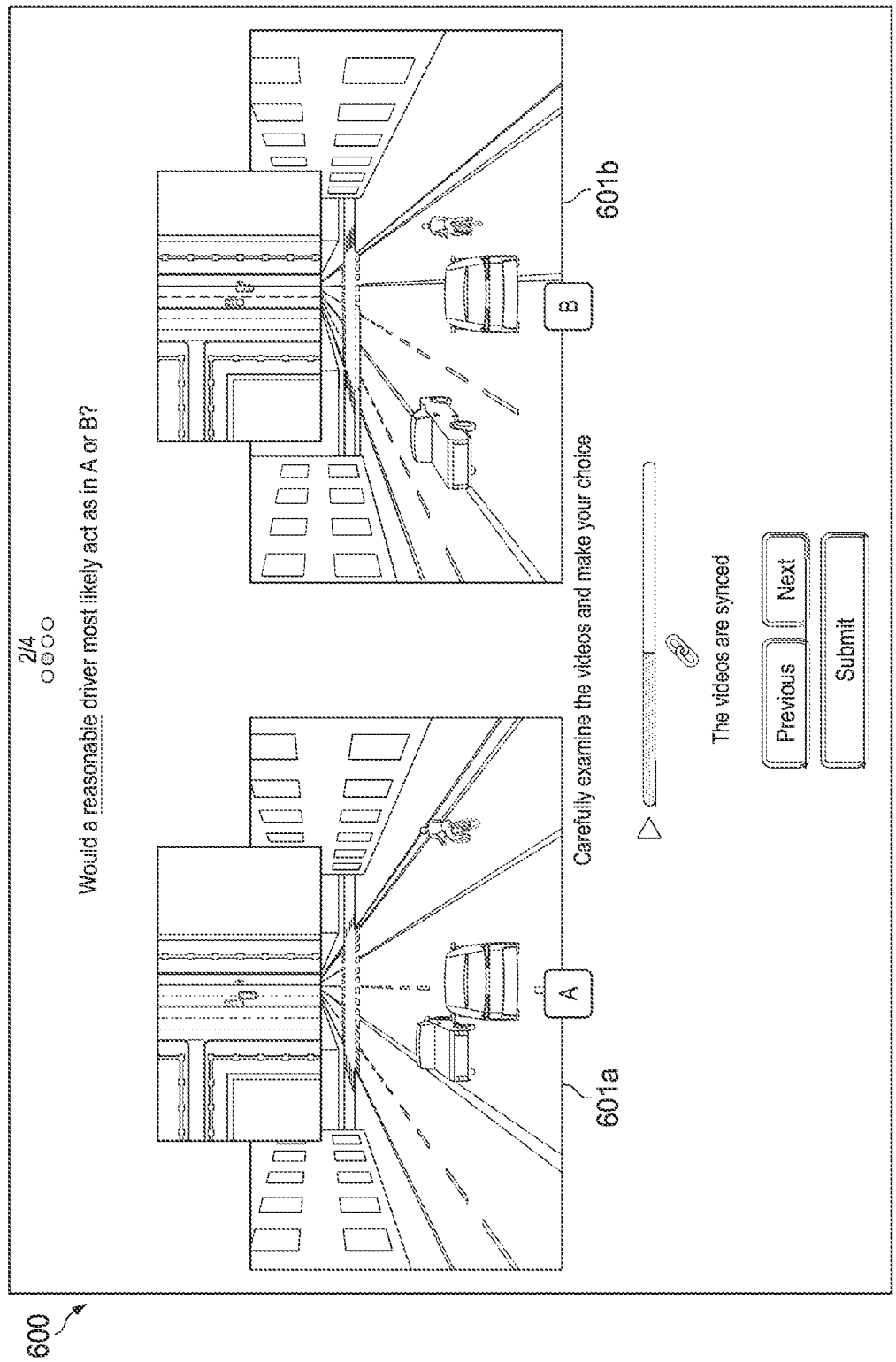
FIG. 6 is an example annotation tool interface for allowing human annotators to select a trajectory from a pair of trajectories, in accordance with one or more embodiments.

FIG. 6 is an example annotation tool interface 600 for allowing human annotators to select a trajectory from a pair of trajectories, in accordance with one or more embodiments. Other embodiments of tool interface 600 are also possible. In the example shown, the human annotator is show a video 601a (A) and a video 601b (B) presented side-by-side on, for example, a computer screen, with the instruction: "Would a reasonable driver most likely act as in A or B?" The interface 600 includes navigation controls, such as a play button that allows the annotator to replay the video. The annotator can click one of the videos 601a, 601b to indicate their preference. The navigation controls also include graphical user interface (GUI) elements to allow the annotator to move backward and forward between different traffic scenarios.

Rulebooks

As previously defined above, a "rulebook" is a collection of traffic laws, rules of the road, and stakeholder requirements that are translated into mathematical rules:

$$r_i: W \to R, i=1 \ldots n, \quad [5]$$

where it is assumed that there are n rules, and R is a set of real numbers. The function $r_i(w)$ indicates the degree of violation or satisfaction of a particular rule by the AV in w. For example, $r_i(w)$ could indicate whether the AV remains on the road.

Figure 7:
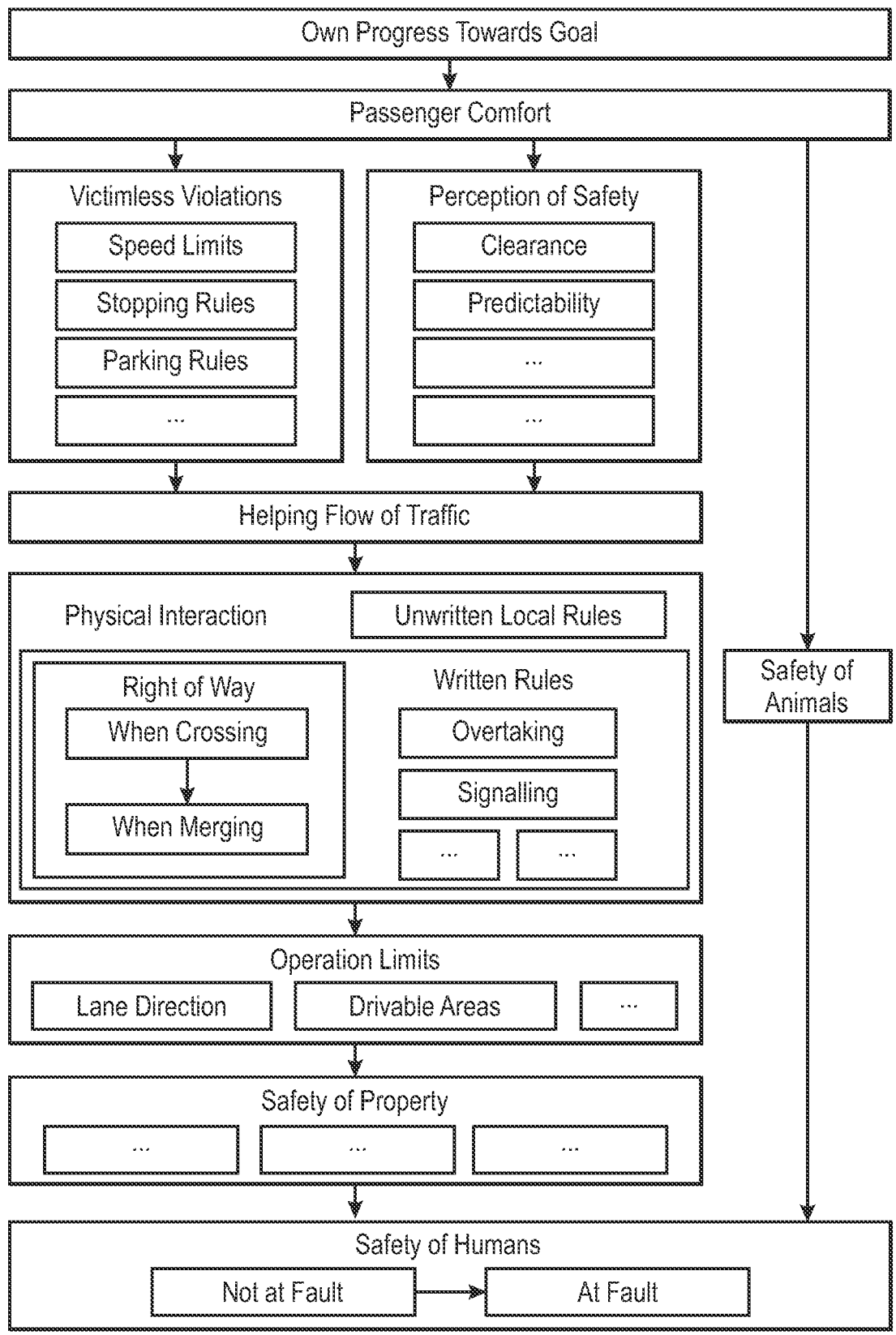
FIG. 7 is an example rulebook with a partial-ordered structure, in accordance with one or more embodiments.

The rulebooks could also have a priority structure that encodes a belief about the relative importance of different rules. An example rulebook 700 with partial ordering is shown in FIG. 7. Notice that the safety of humans is prioritized over violating parking rules, and parking rules and stopping rules are of similar importance, where priority increases from top to bottom. This partial-ordered structure can rank some trajectories (e.g., one in which a pedestrian is hit, and one in which the AV is parked illegally), but not all (e.g., such as one where a parked car is hit, and another trajectory where an animal is hit).

The ML Model-Setup

In an embodiment, a reasonableness scoring function s is defined that can assign reasonableness scores to arbitrary realizations:

$$s: W \to R, \quad [6]$$

such that $s(w_1) > s(w_2)$ if and only if a "reasonable human" would prefer $w_1$ over $w_2$, where $w_1$ and $w_2$ are two different realizations.

The function s could operate directly on a realization but to achieve interpretability its architecture could be constrained so that it first embeds the realization $w_s$ into a collection of rules taken from a rulebook, and then processes them using the ML model:

$$s(w) \approx s_{rules}(e_{rules}(w)), \quad [7]$$

where the rules embedding contains the output of the rulebook and is fully interpretable as:

$$e_{rules}(w) = (r_1(w) r_2(w) \ldots r_n(w))^T \in R^n. \quad [8]$$

The function $s_{rules}$ is a learned ML model that scores trajectories based on rule violations or satisfactions, and could, for example, be a fully-connected neural network or a decision tree. Note that there are some constraints on $s_{rules}$. Assuming that a greater $r_i(w)$ indicates a greater satisfaction of rule i then we have the constraint:

$$s_{rules}(e_{rules}(w) + \delta \alpha_i) > s_{rules}(e_{rules}(w)). \quad [9]$$

For $1 \leq i \leq n$, any w and $\delta$ are any positive real number. The variable $\alpha_i$ is the ith unit vector in n dimensions and is 0 everywhere except for its ith entry which is 1. Equation [9] states that if two realizations $w_i$ and $w_2$ are identical, except that $w_2$ violates a particular rule more, then $w_i$ must be more reasonable than $w_2$.

Figure 8:
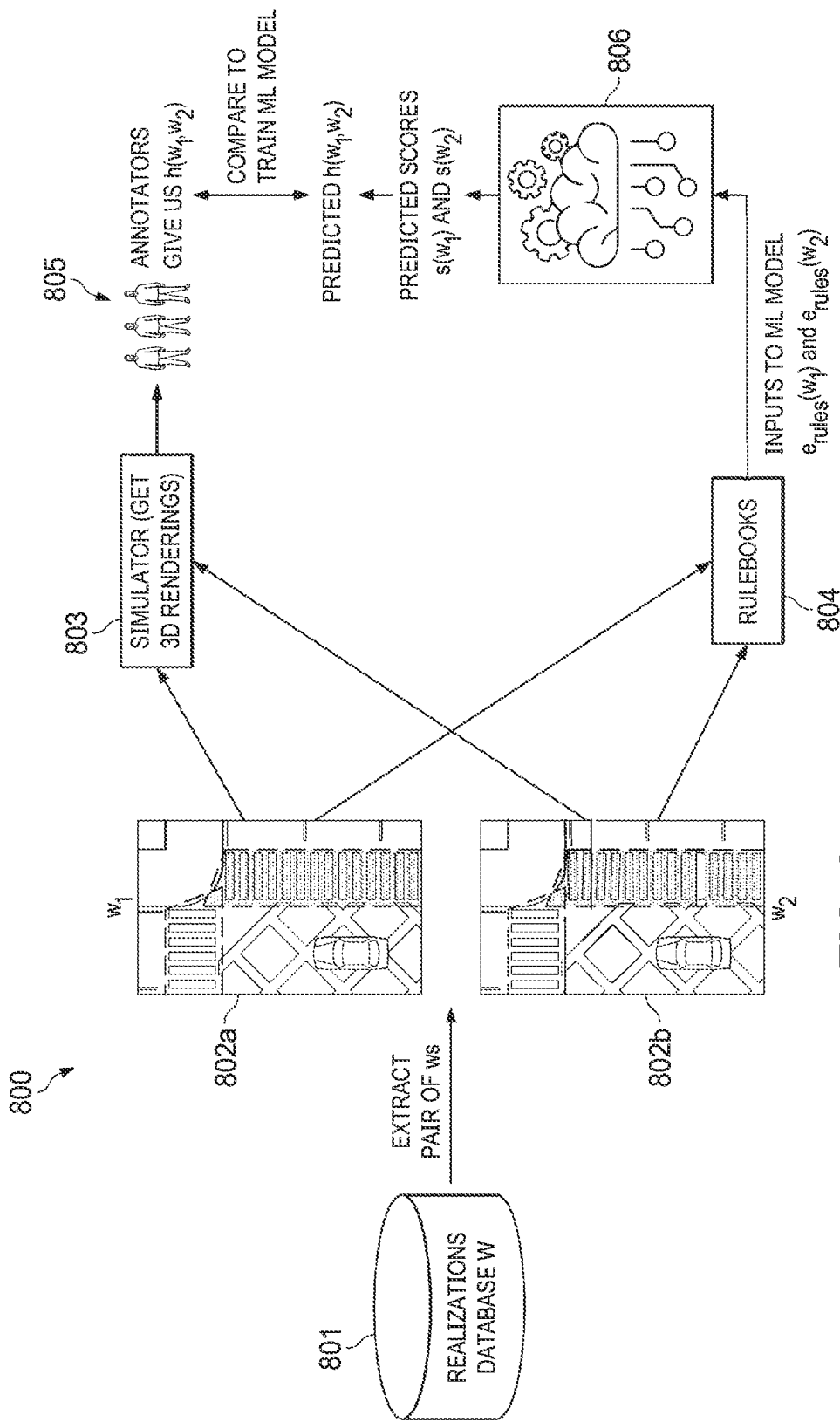
FIG. 8 illustrates an ML training procedure, in accordance with one or more embodiments.

FIG. 8 illustrates an ML training procedure 800, in accordance with one or more embodiments. In the example shown, a database 801 of realizations W is queried for a pair of realizations $(w_1, w_2)$. One or more rulebooks 1804 are then used to convert the realizations to $e_{rules}(w_1)$ and $e_{rules}(w_2)$, which are each a list/vector of scores indicating how well the AV adheres to different rules (e.g., traffic laws). The ML model 806 processes $e_{rules}(w_1)$ and $e_{rules}(w_2)$ and rates $w_i$ and $w_2$. If for example it rates $w_i$ higher than $w_2$, then the ML model 806 predicts that $w_i$ is more reasonable than $w_2$. The parameters of the ML model 806 are modified if this is not true, as determined by a plurality of human of annotators 805 that are shown 3D renderings 803 of $w_i$ and $w_2$, as described in reference to FIG. 6. Note that in other embodiments instead of annotating pairs of realizations, annotators can rank any number of trajectories against each other.

Tuning Model Parameters

ML model 806 has many parameters that need to be determined from training data. In particular, assume that our training data database includes K realization pairs and their associated labels, given by:

$$D = \{(x_k, y_k)\}, \quad [10]$$

$$x_k = (u_k, v_k), \quad [11]$$

$$y_k = h(u_k, v_k). \quad [12]$$

where $u_k$ and $v_k$ are realizations and $k=1 \ldots K$.

The learning problem is posed as a classification problem: given a pair of realizations x=(u, v) and it's associated label y=h (u, k), ML model 806 predicts whether the realization u is more reasonable than the realization v. In an embodiment, ML model 806 is run twice: once for each of $e_{rules}$ (u) and $e_{rules}$ (v), and generates two predictions: the reasonableness scores s (u) and s(v). A score differential is defined as $$d(x)=s(u)-s(v), \quad [13]$$

where ML model 806 is used to classify x in the following way:

$$\hat{y} = \begin{cases} +1 & \text{if } d(x) > 0 \\ -1 & \text{otherwise} \end{cases}. \quad [14]$$

The parameters of ML model 806 are then determined by minimizing the objective (loss) function:

$$\Sigma_{k=1}^{K} L(y_k, d(x_k)) + L_{reg} + L_{rb}. \quad [15]$$

where L (y, d(x)) penalizes the model if y≠ŷ. The size of the penalty is determined by d(x). $L_{reg}$ is a regularization term and can, for example, be an L1 or L2 regularization term. $L_{rb}$ penalizes predictions that violate a rulebook's structure:

$$L_{rb}=\lambda_{rb}\Sigma_{k=1}^{K} \max(0,-y_k^{rb} d(x_k)), \quad [16]$$

where $\lambda_{rb}$ is a positive scalar encoding the importance of $L_{rb}$ relative to the other loss terms, and $y_k^{rb}$ is the rulebook's prediction of whether the realization $u_k$ is preferable to $v_k$, $u_k$ and $v_k$ are the pair of realizations in the kth sample, where k=1 . . . K (so $y_k$=h ($u_k$, $v_k$)). Note that the rulebook cannot always compare two realizations, in which case $y_k$ is equal to $y_k^{rb}$=0. The rulebook can only compare two realizations if one of them violates a rule in a higher hierarchy level. Specifically, $$y_k^{rb} = \begin{cases} 1 & \text{rulebook predicts that } u_k \text{ is preferable to } v_k \\ -1 & \text{rulebook predicts that } u_k \text{ is preferable to } v_k \\ 0 & \text{otherwise} \end{cases} \quad [17]$$

Possible Loss Functions

In an embodiment, a hinge loss function can be used as the objective function. The hinge loss expects a clear margin between the samples with label y=+1 and the samples with label y=−1. The hinge loss function is given by:

$$L_{hinge}=(y,d(x))=\max(0,1-y*d(x)), \quad [18]$$

where d(x) is the differential score on input x. In another embodiment, a different loss function can be used that allows for slack, given by:

$$L_{slack}=(y,d(x))=\max(0,-1-y*d(x)). \quad [19]$$

In an embodiment, L1 or L2 losses, or a combination of L1 and L2 losses (smoothed L1 loss) can be used. For example, the L2 loss is given by:

$$L_{l2}=(y,d(x))=\max(0,-y\ \text{sign}(d(x))d(x)^2). \quad [20]$$

Regression Learning Embodiment

In an embodiment, ground-truth data are assigned to realizations by fitting stochastically transitive models to the annotators' preferences, as described in Nihar B. Shah, Sivaraman Balakrishnan, Adityanand Guntuboyina, and Martin J. Wainwright. Stochastically Transitive Models for Pairwise Comparisons: Statistical and Computational Issues, 2015.

These stochastically transitive models provide ground-truth regression targets for the samples $x_k=(u_k, v_k)$ where k=1 . . . K.

$$\bar{d}_k = \tilde{s}_{u_k} - \tilde{s}_{v_k}, \quad [21]$$

where $\tilde{s}_{u_k}$ is the ground-truth score assigned to the realization u. The parameter $d(x_k)$ is then compared directly to $\bar{d}_k$, and regression losses, such as the L2 regression loss $(d(x_k)-\bar{d}_k)^2$ are used. Alternatively, s(u) can be compared directly to $\tilde{s}_{u_k}$.

Example Architectures

There are a wide variety of ML models that can be employed in the disclosed embodiments. Artificial neural networks are especially popular, and in practice do very well. However, for simplicity Linear Support Vector Machines (linear SVM) can be used. The Linear SVM is also easier to interpret. Other models, include but are not limited to regression analysis, Bayesian prediction, multi-layer perceptron, and genetic programming.

In an embodiment, a linear SVM, ƒSVM, assigns a weight to each rule in a rulebook. A larger weight indicates a more important rule. The linear SVM then rates a realization w with rule scores $e_{rules}$ (w) in the following way:

$$f\text{SVM}(\text{erules}(w))=\alpha \cdot \text{erules}(w), \quad [22]$$

where α∈ Rn, and for simplicity the bias term is omitted.

For an input x=(u, v), the differential score is given by:

$$d(x) = \alpha.e_{rules}(u) - \alpha.e_{rules}(v) \quad [23]$$

$$= \alpha.(e_{rules}(u) - e_{rules}(v)). \quad [24]$$

Consequently, a linear SVM can be trained on a datum (x, y) by running it once instead of twice. The rules differential are provided as $(e_{rules}(u)-e_{rules}(v))$. Linear SVMs employ the hinge loss shown in Equation [18], and for linear SVMs the L2 regularization term is of the form λα·α. where λ∈ R.

Alternative Embeddings

Although traffic laws strongly influence a driver's behavior, they are not the only factors that determine their behavior. Other factors, such as the behavior of other agents and how occluded a driver's view are also playing a role. On their own, the traffic laws do not contain enough information to always understand annotators' preferences for what constitutes reasonable behavior. Even if the rules were extended to include behavior that is not encoded in the laws (e.g., a rule that penalizes oscillatory trajectories), a given set of rules may not include all relevant factors. In some embodiments, kinematic factors are ranked according to passenger comfort. In examples, passenger comfort characterizes how a passenger feels (e.g., a determination of a particular emotion or sensation; a self perception of a particular emotion or sensation). For example, a higher passenger comfort is associated with a passenger perceiving safety, protection or non-intimidation during a ride, such as when traversing a traffic scenario. A lower passenger comfort is associated with passengers perceiving danger, vulnerability, or intimidation during the ride. The factors are quantified through the creation of human-adopted baselines for each factor.

Figure 9:
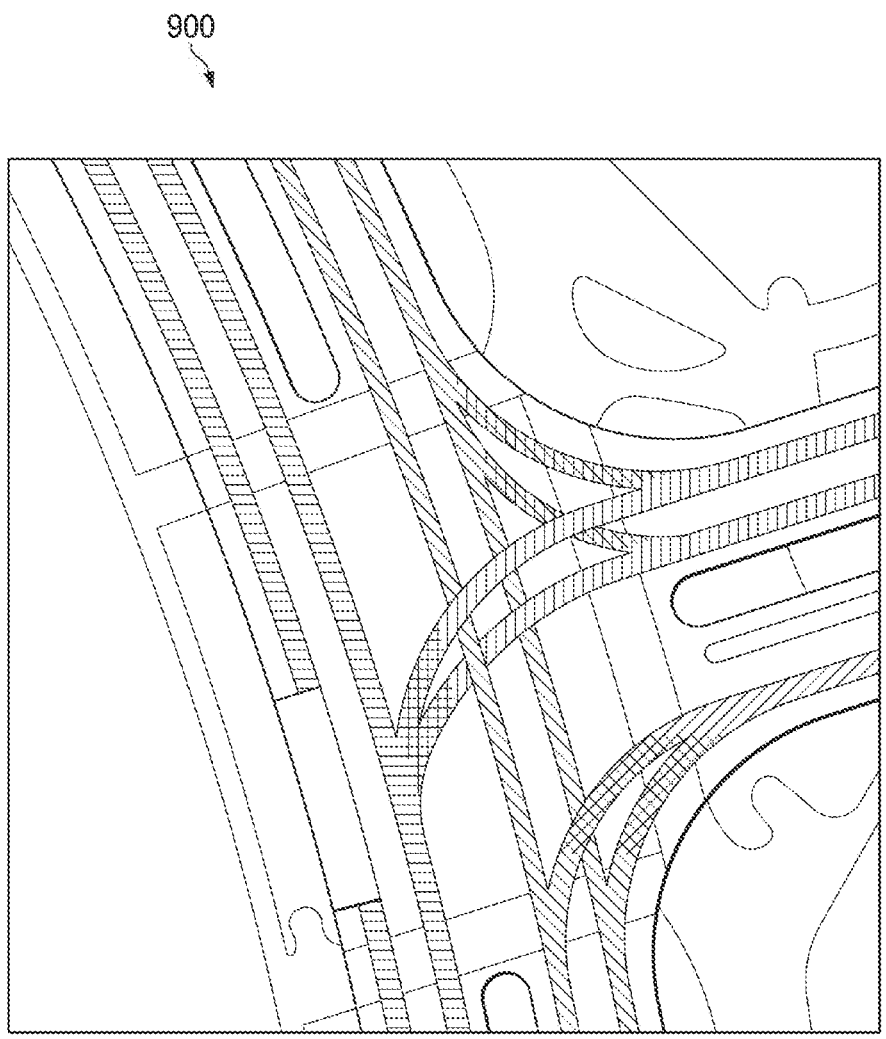
FIG. 9 illustrates an example bird's eye view (BEV) embedding (pseudo-image) of a traffic scenario to be used as training data for a neural network, in accordance with one or more embodiments.

FIG. 9 illustrates an example bird's eye view (BEV) embedding 900 of a traffic scenario to be used as training data for a neural network, in accordance with one or more embodiments. In an embodiment, more information is captured in a particular scene by embedding many relevant aspects of the scene into a BEV pseudo-image, as is commonly used in the behavior prediction literature. Such an embedding could be, for example, a function:

$$e_{img}: W \rightarrow RC \times H \times W, \quad [25]$$

that maps a scenario to a pseudo-image of height H, width W and C channels. For example in the pseudo RGB image shown in FIG. 8, C=3 and includes the drivable area 901, cross walks 902, etc. The scoring function that is learned would operate on the embedding $e_{img}$ (w) instead of $e_{rules}$ (w), and Equation [7] is replaced with:

$$s(w) \approx s_{img}(e_{img}(w)). \quad [26]$$

Thus, embedding realizations in pseudo-images provides an alternative reasonableness scoring method to compare against, inform and validate, the rule embedding. For example, a large performance gap between an ML model based on a learned embedding versus one based on the rule embedding suggests relevant rules may be missing.

Note that in an embodiment, $s_{img}$ can be a Convolutional Neural Network (CNN), as the computer vision community has shown their superior effectiveness on pseudo-images. The CNN used could, for example, be a residual network, as described in Kaiming He, Xiangyu Zhang, Shaoqing Ren, and Jian Sun. Deep residual learning for image recognition, 2015. Or, alternatively, the VGG network described in Karen Simonyan and Andrew Zisserman. Very Deep Convolutional Networks for Large-Scale Image Recognition, 2014.

In other embodiments, other types of embeddings can be used, such as vector embeddings that operate directly on a vector representation of the trajectories. Vector embeddings are described in Jiyang Gao et al. VectorNet: Encoding HD Maps and Agent Dynamics from Vectorized Representation-.arXiv:2005.04259v1 [cs.CV].

Additional User Cases

A. Evaluating Planner Performance

In an embodiment, the techniques described can be used to tune a route planner and its performance. Given a collection of L traffic scenarios $$\beta = \{b_1, \ldots, b_L\}. \quad [27]$$

A route planner is run on each scenario. The route planner uses a trained ML model as described above to predict a trajectory for each of the L traffic scenarios:

$$\{W_1, \ldots, W_L\}. \quad [28]$$

The ML model rates each of the trajectories, resulting in L scores:

$$S = \{s_1, \ldots, s_L\}. \quad [29]$$

A metric can be formed for the planner from these scores. For example, the metric could be the average of the scores:

$$\text{metric} = \frac{1}{L} \sum_{i=1}^{L} s_i. \quad [30]$$

Additionally, the scores can help fine-tune the planner by identifying which scenarios the planner performed badly on. The parameters or design of the planner can then be changed to address the inadequate performance.

B. Comparing Two AV Stacks

In an embodiment, the reasonable-crowd score provides a way to compare the performance of two AV software stacks. The AV software stacks could differ in one or more subsystem implementations (e.g., the planner and/or the object detector). In an embodiment, the metric of Equation [30] is used to compare the performance of the AV software stacks.

C. Reinforcement Learning

In an embodiment, the trained ML model described above is used as a reward function in a reinforcement learning algorithm. In real-world robotics, designing a good reward function is crucial for obtaining reasonable behavior.

Figure 10:
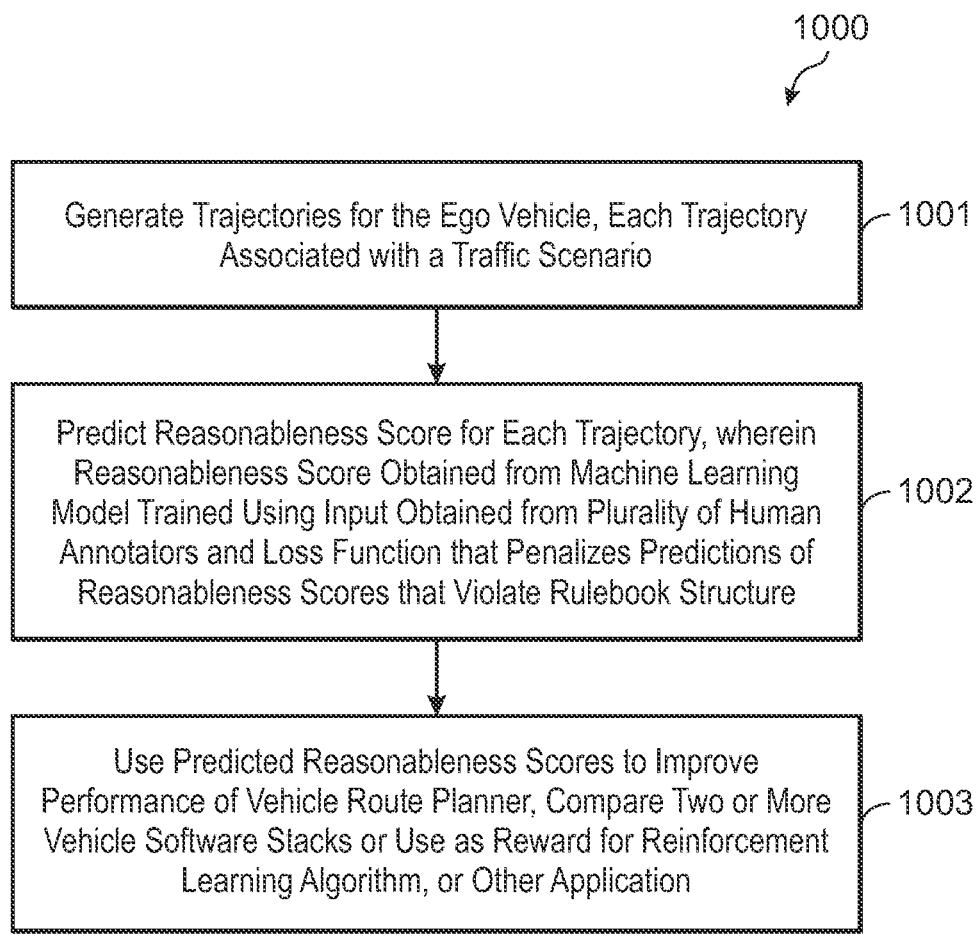
FIG. 10 is a flow diagram of a process of using an ML model to predict a reasonableness score for an AV trajectory, in accordance with one or more embodiments.

FIG. 10 is a flow diagram of a process 1000 of using an ML model to predict a reasonableness score for an AV trajectory during real-time operation of the AV, in accordance with one or more embodiments. Process 1000 can be implemented, for example, by the computer system 300 described in reference to FIG. 3.

Process 1000 begins by generating a set of trajectories for the AV, where each trajectory is associated with a traffic scenario (1001). For example, a planning module 404 of the AV can generate multiple candidate trajectories for a traffic scenario, each of which satisfies the rules in a rulebook.

Process 1000 continues by predicting a reasonableness score for each trajectory, wherein the reasonableness score is obtained from a machine learning model that is trained using input obtained from a plurality of human annotators and a loss function that penalizes predictions of reasonableness scores that violate a rulebook structure (1002). For example, an ML model trained to predict reasonableness scores can be trained with sets of rulebook scores generated by embedding pairs of realizations into the rules of a rulebook, where the set of scores indicate or correspond to how well a particular realization adheres to the rules (i.e., violates or satisfies the rules).

Process 1000 continues by using the predicted reasonableness scores to improve the performance of a vehicle route planner, to compare two or more vehicle software stacks, as a reward for a reinforcement learning algorithm or used by any other application that could benefit from a machine learning model that scores vehicle trajectories (1003). For example, the planning module 404 can use the predicted reasonableness scores to select the most reasonable trajectory to be used by the AV to traverse a traffic scenario, i.e., avoid collision with pedestrian 502.

Figure 11:
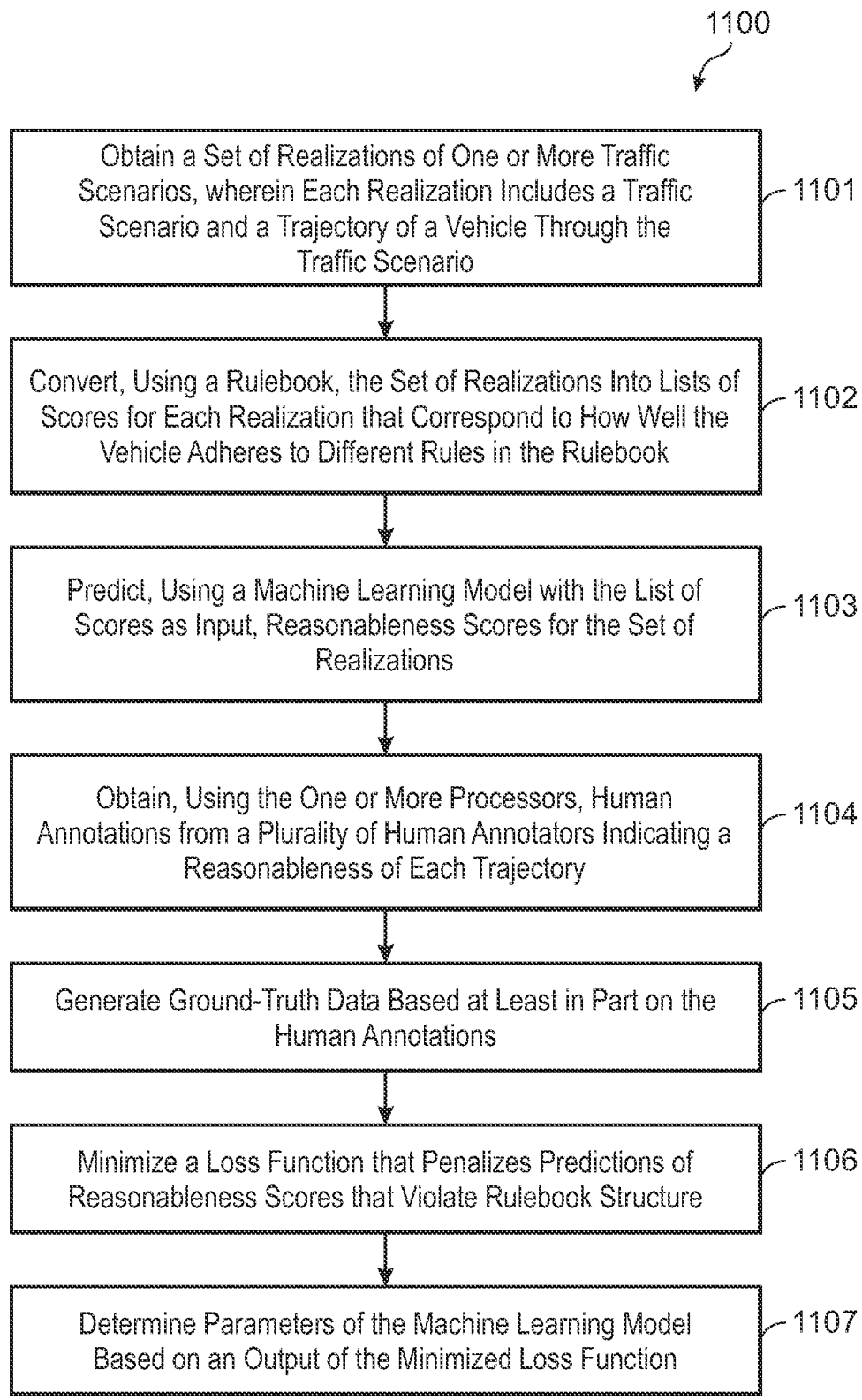
FIG. 11 is a flow diagram of a process of training an ML model to predict a reasonableness score for an AV trajectory, in accordance with one or more embodiments.

FIG. 11 is a flow diagram of a process 1100 of training an ML model to predict a reasonableness score for an AV trajectory, in accordance with one or more embodiments. Process 1100 can be implemented, for example, by the computer system 300 described in reference to FIG. 3.

Process 1100 begins by obtaining a set of realizations of one or more traffic scenarios, wherein each realization includes a traffic scenario and a trajectory of a vehicle traversing the traffic scenario (1101). In an embodiment, a human subject sits in a vehicle that traverses the same real traffic situation in different ways. In an alternative embodiment, a simulator is used that ingests a representation created by hand with a test case editor or created by an algorithm that simulates traffic. The simulator produces 3D videos that are then presented to the human annotators on a display, such as a computer display.

Process 1100 continues by converting, using a rulebook, the set of realizations into a set of scores for each realization that correspond to how well the trajectory adheres to different rules in the rulebook (1102). In an embodiment, the realizations are embedded into a collection of rules taken from a rulebook, where the rulebook includes a collection of traffic laws, rules of the road and stakeholder requirements that are translated into precise mathematical rules. There is a set of scores for each realization, where each particular score in the set indicates how well the trajectory adhered to a particular corresponding rule. In an embodiment, a planning module would add all the scores for each trajectory, and the trajectory with the highest total score would be selected as the "best" trajectory for the AV for the particular traffic scenario. However, if there are multiple candidate trajectories available that have identical scores, then reasonable scores can be looked at to help select the most reasonable trajectory, as described in the next process step.

Process 1100 continues by predicting, using a machine learning model with the set of scores as input, reasonableness scores for the set of realizations (1103). The machine learning model can be any model that can be trained to predict reasonableness scores, including but not limited to a linear SVM, or if the realizations are embedded in a pseudo-image, then a CNN, for example.

Process 1100 continues by obtaining annotations from a plurality of human annotators indicating a reasonableness of each realization (1104). For example, pairs of realizations can be rendered into two-dimensional (2D) or 3D videos and presented to a plurality of annotators, as described in reference to FIG. 6. The annotators are asked to choose the realization of the pair they think is most reasonable. The pair of realizations can include the same traffic scenario or different traffic scenarios.

Process 1100 continues by generating ground-truth data based at least in part on the annotations (1105). For example, the annotations can be encoded by a function that outputs a first value (e.g., +1) if the annotator preferred a first realization, and another value otherwise (e.g., −1). The function can then be used to create ground-truth data using, for example, stochastically transitive models, such as the Bradley-Terry model.

Process 1100 continues by minimizing a loss function of the ground-truth data and predicted reasonableness scores, wherein the loss function penalizes predictions of reasonableness scores that violate the rulebook structure (1106). In an embodiment, a hinge loss function can be used as the objective function. In another example, a loss function allows for slack can be used. In yet another embodiment, L1 or L2 losses, or a combination of L1 and L2 losses (smoothed L1 loss) can be used.

Process 1100 continues by determining parameters of the machine learning model based on an output of the minimized loss function (1107). For example, a differential reasonableness score can be minimized.

In some embodiments, determining a trajectory of the AV includes considering the ride comfort of the passenger(s) in addition to other considerations as described above. The ML model as described herein can predict reasonableness scores based on, for example, metrics created based on at least one factor. In examples, passenger comfort is a low priority rule as illustrated in FIG. 7. In embodiments, metrics associated with passenger comfort are included in a set of rules embodied in a rulebook. Additionally, in examples the metrics associated with passenger comfort are assigned to respective realizations. The present techniques rank factors that characterize ride comfort for a passenger, and enable resolution of apparent conflict between competing comforts in an interpretable form.

In embodiments, the present techniques create metrics based on kinematic factors and enable an interpretable capture of tradeoffs between factors. In examples, a set of kinematic factors is ranked based on each factor's impact on passenger comfort. The factors are quantified using empirical or human-adopted baselines for each factor. In examples, the factors are associated with one or more contexts. In embodiments, the present techniques resolve competing ride comfort factors (i.e., kinematic factors) for planning trips, controlling the AV, and/or for feedback purposes for additional training, machine learning, or other intelligence through the ranking of the factors.

The present techniques establish a hierarchy of individual kinematic factors in a priority structure instructing the relative importance of each factor when creating a comfort metric. This hierarchy is based on, at least in part, a large-scale study using survey-oriented responses. A framework is created to investigate ride comfort, including: (1) identification of individual dynamic factors influencing ride comfort, (2) generation of a hierarchy instructing contribution and decision-making for the AV stack (e.g., autonomous vehicle compute 202*f* of FIG. 2), and (3) guiding baseline definitions of ride comfort based on naturalistic driving studies and roadside instrumentation.

In embodiments, the kinematic factors characterize a relationship between the AV and the environment. In embodiments, the kinematic factors are derived from the AV's movement through the environment. The kinematic factors described herein are dependent on attributes of objects (e.g., objects 104*a*-104*n* of FIG. 1) in the environment (e.g., environment 100 of FIG. 1). The kinematic factors are further described in exemplary traffic scenarios of FIGS. 13-25 below. In embodiments, a set of realizations is associated with the traffic scenarios of FIGS. 13-25 below. Attributes of the object refer to the size of the object (e.g., height, width, shape), or a type of the object (e.g., bicycles, vehicles, traffic signs, pedestrians, and/or the like), and/or a danger rating of the object. Objects in the environment are associated with a danger rating as described with respect to FIG. 12. A danger rating indicates how dangerous the object is perceived to be or the level of severity of damage that could be caused if a collision were to occur.

Figure 12:
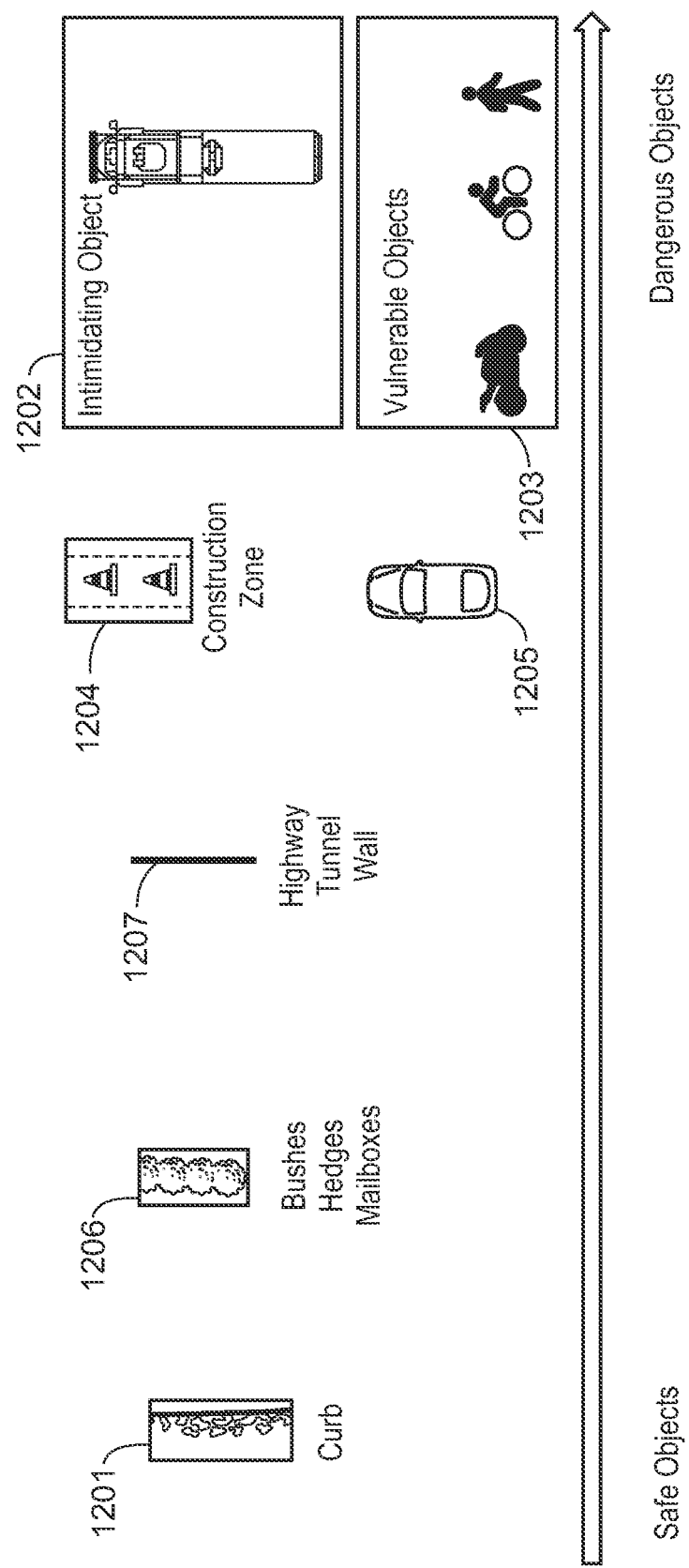
FIG. 12 is a schematic diagram illustrating the danger ratings of certain objects that an autonomous vehicle might encounter in accordance with embodiments.

FIG. 12 is a schematic diagram illustrating the danger ratings of a plurality of objects that an autonomous vehicle might encounter in accordance with embodiments of the present disclosure. Static objects have a relatively low danger rating. For example, a curb 1201 is static, low to the ground, and does not represent a large risk to the safety of the passenger in an autonomous vehicle or to other agents (e.g., drivers, pedestrians, cyclists, etc.). The danger rating becomes higher as the perceived risk of damage or injury increases. For example, an intimidating object 1202 (a gross weight of a vehicle more than 10,000 pounds), such as a semi-truck, bus, etc., has a high danger rating, because the perceived risk of damage or injury would be high for the driver or/and the passenger in the autonomous vehicle if the autonomous vehicle collided with the semi-truck. In addition, the semi-truck is "intimidating" to most drivers and passengers from a ride comfort perspective. For another example, a vulnerable object 1203, such as a motorcyclist, a bicyclist, or a pedestrian, also has a high danger rating, because the perceived risk of damage or injury would be high for the vulnerable object if the autonomous vehicle collided with the vulnerable object 1203. Thus, it may be more comfortable for the driver or/and the passenger in the autonomous vehicle to maintain a greater distance away from a vulnerable object. As shown in FIG. 12, the danger ratings for exemplary objects are provided as, in order from the highest danger rating to the lowest danger rating: intimidating object 1202/vulnerable object 1203 >construction zone 1204/passenger vehicle 1205 >highway/tunnel/wall 1207 >bushes/hedge/mailbox 1206 >curb 1201. The intimidating object 1202 and the vulnerable object 1203 have the same danger rating; the construction zone 1204 and the passenger vehicle 1205 have the same danger rating; the highway, the tunnel, and the wall 1207 have the same danger rating; and the bushes, the hedge, and the mailbox 1206 have the same danger rating.

The perception of risk of damage and injury as established by the danger rating guides the understanding of how to increase ride comfort in different traffic scenarios. In addition, the danger ratings of objects can be used to determine how to operate the autonomous vehicle responsive to a conflict between perceived risks associated with multiple objects. For example, if an intimidating object is on one side of the autonomous vehicle while a vulnerable object is on the other side of the autonomous vehicle, then a decision on how to operate the autonomous vehicle to deal with the competing discomfort arising from proximity to either object can be made based on the danger ratings of objects.

For ease of description, particular kinematic factors associated with passenger comfort are provided. However, the kinematic factors can include any AV behavior that is controlled to impact passenger comfort. In examples, the kinematic factors are, in order from the most impactful on overall passenger comfort to the least impactful on overall passenger comfort: (1) minimum lateral clearance from surrounding static objects (object height dependent); (2) minimum lateral clearance from surrounding dynamic objects (object height dependent); (3) minimum longitudinal clearance from surrounding static objects (object height and object type dependent); (4) minimum longitudinal clearance from surrounding dynamic objects (object height and object type dependent); (5) longitudinal velocity (lateral clearance to static objects dependent); (6) relative velocity with respect to surrounding road actors (lateral clearance to dynamic objects dependent); (7) longitudinal acceleration/longitudinal deceleration (velocity dependent); (8) lateral acceleration/lateral deceleration (velocity dependent); (9) longitudinal jerk; (10) lateral jerk. (11) lateral motion stability and damping (smoothness over time, e.g., avoid swaying); and (12) longitudinal motion stability/damping (smoothness over time, avoid multiple stop/start brake events.

In some embodiments, human-adopted baselines are defined based on large-scale analysis of human behaviors. The kinematic factors can be compared with the baselines, so as to determine a degree of ride comfort for drivers or/and passengers. For example, when the AV is driving past a pedestrian (e.g., an object), a lateral clearance between the pedestrian and the AV indicating a comfort threshold can be calculated as below:

$$\text{Clearance} = 1.5 + 0.067 V_{ego}(t) \quad [31]$$

where $V_{ego}(t)$ is the velocity of the AV. In some embodiments, a clearance comfort threshold is applied to relevant kinematic factors and metrics are created that quantify deviations from the clearance comfort threshold. In some embodiments, a baseline clearance is calculated using an analysis of human behavior. In examples, a baseline clearance is determined and applied to kinematic factors such as minimum lateral clearance from surrounding static objects, minimum lateral clearance from surrounding dynamic objects, minimum longitudinal clearance from surrounding static objects, and minimum longitudinal clearance from surrounding dynamic objects.

Similarly, a longitudinal acceleration indicating a comfort threshold can be calculated as below:

$$\text{Acceleration}_{Longitudinal} = \begin{cases} 2.0 \ m/s^2 & v_{ego}(t) \le 10 \ m/s \\ 3.5 - 0.15 \ v_{ego}(t) & 10 \ m/s \le v_{ego}(t) \le 15 \ m/s \\ 1.25 \ m/s^2 & 15 \ m/s \ge v_{ego}(t) \end{cases} \quad [32]$$

In some embodiments, a longitudinal acceleration comfort threshold is applied to relevant kinematic factors and metrics are created that quantify deviations from the longitudinal acceleration comfort threshold. In some embodiments, a baseline longitudinal acceleration is calculated using an analysis of human behavior. The baseline longitudinal acceleration is determined and applied to the longitudinal acceleration kinematic factor.

A deceleration indicating a comfort threshold can be calculated as below:

$$\text{Deceleration} = \begin{cases} 2.5 \ m/s^2 & v_{ego}(t) \le 10 \ m/s \\ 3.5 - 0.10 \ v_{ego}(t) & 10 \ m/s \le v_{ego}(t) \le 20 \ m/s \\ 1.5 \ m/s^2 & 20 \ge v_{ego}(t) \end{cases} \quad [33]$$

In some embodiments, a deceleration comfort threshold is applied to relevant kinematic factors and metrics are created that quantify deviations from the deceleration comfort threshold. In some embodiments, a baseline deceleration is calculated using an analysis of human behavior. The baseline deceleration is determined and applied to the deceleration kinematic factors.

A lateral acceleration indicating a comfort threshold can be calculated as below:

$$\text{Acceleration}_{Lateral} = \begin{cases} 3.0 \ m/s^2 & v_{ego}(t) \le 10 \ m/s \\ 4.5 - 0.15 \ v_{ego}(t) & 10 \ m/s \le v_{ego}(t) \le 20 \ m/s \\ 1.5 \ m/s^2 & 20 \ m/s \ge v_{ego}(t) \end{cases} \quad [34]$$

In some embodiments, a lateral acceleration comfort threshold is applied to relevant kinematic factors and metrics are created that quantify deviations from the lateral acceleration comfort threshold. In some embodiments, a baseline lateral acceleration is calculated using an analysis of human behavior. The baseline lateral acceleration is determined and applied to the longitudinal acceleration kinematic factor.

These example Equations 31-34 above can be used to obtain comfort threshold values for drivers or/and passengers of the AV. For example, if a lateral clearance is smaller than the clearance threshold calculated through Equation 31, then the drivers or/and passengers of the AV would feel uncomfortable. If a longitudinal acceleration is higher than the acceleration threshold calculated through Equation 32, then the drivers or/and passengers of the AV would feel uncomfortable. The same applies to the deceleration threshold calculated through Equation 33 and the lateral acceleration threshold calculated through Equation 34.

In embodiments, each factor value can be compared to its respective comfort threshold value, and a metric quantifying the ride comfort can be derived from one or more of the set of kinematic factors based on these human-adopted baselines, i.e., comfort threshold values for the set of kinematic factors.

Figure 24:
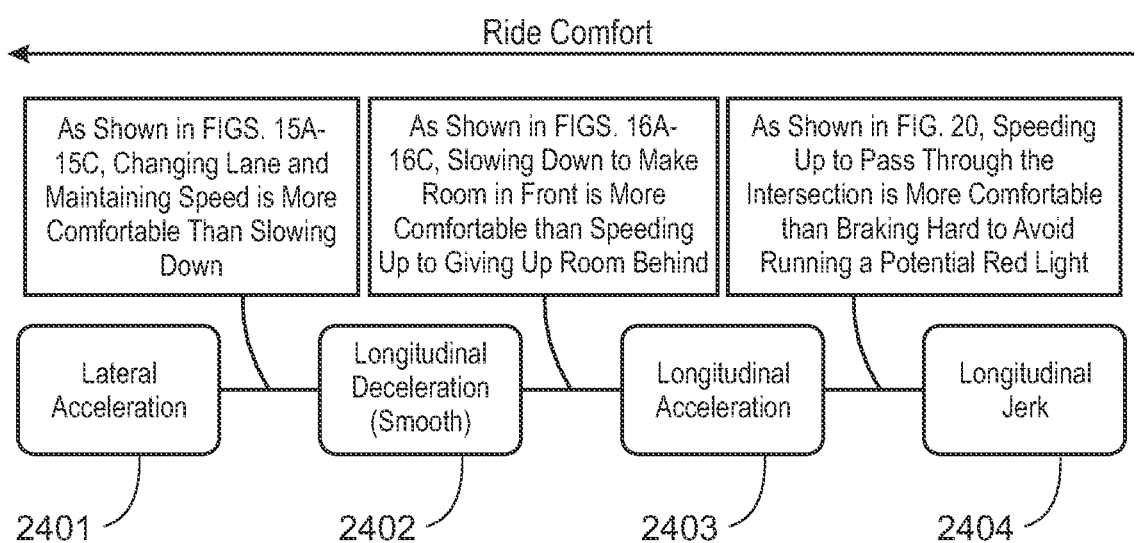
FIG. 24 is a schematic diagram illustrating operation preferences based on ride comfort in accordance with embodiments.
Figure 25:
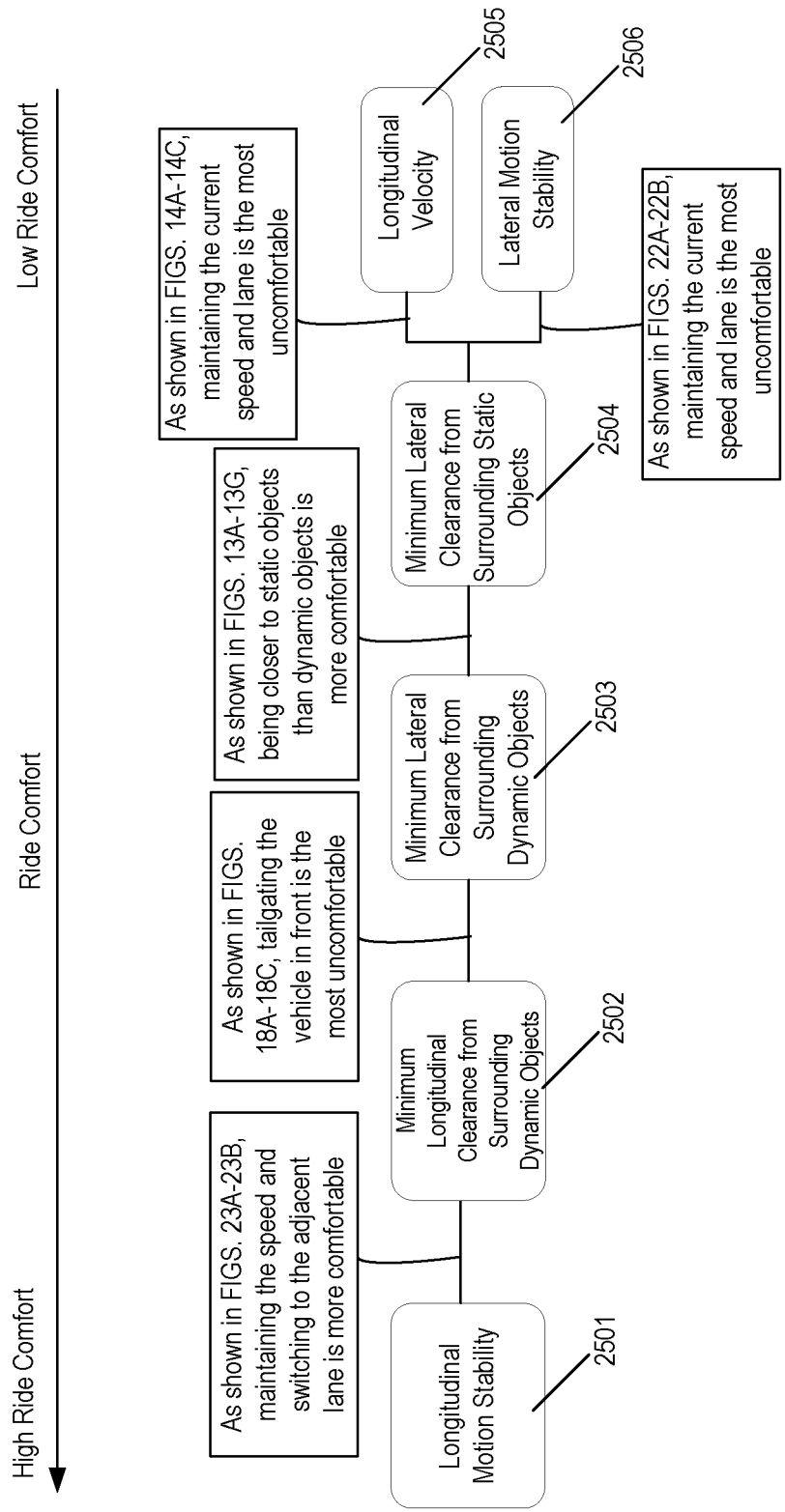
FIG. 25 is another schematic diagram illustrating operation preferences based on ride comfort in accordance with embodiments.

The kinematic factors are used to derive comfort metrics as described with respect to FIGS. 24 and 25. These kinematic factors that contribute to passenger perceptions of ride quality are identified to enable an evaluation of each factors' respective impact on what makes a ride comfortable or uncomfortable. Additionally, the driving maneuvers, experiences, and situations are evaluated in view of each kinematic factor and the resulting perception of ride quality. In the exemplary traffic scenarios described herein, the kinematic factors can be in tension with one another. As described with respect to FIGS. 13-23, human behavior during traffic scenarios is obtained to determine baselines (e.g., comfort threshold values) associated with the kinematic factors. In examples, in response to traffic scenarios with various objects, danger ratings, and the like, respondents select scenarios with velocities, accelerations/decelerations, object clearances that are perceived as comfortable. Survey respondents selected the scenarios that they would feel more comfortable in, with each traffic scenario including varying kinematic factors. As shown in FIGS. 24 and 25, the outcome of that survey is a list of kinematic factors, ranked by the impact that each factor has on overall passenger comfort.

In an embodiment, a statistical survey can be conducted on drivers or/and passengers to collect statistical data regarding the comfort of operations in a competing setting. In another embodiment, traffic scenarios having a competing setting are simulated, so that human behaviors of human drivers can be monitored (e.g., by cameras) to collect data regarding the comfort of operations in a simulated competing setting. The operations for trajectory planning can be determined by a plurality of factors including safety, lawfulness, ride comfort, and other driving considerations. FIGS. 13-23 below illustrate various traffic scenarios in which trajectories are determined based on the kinematic factors. The determination is made on the premise that safety and lawfulness are satisfied.

FIGS. 13A-13K are schematic diagrams illustrating various traffic scenarios regarding lateral clearance in accordance with embodiments of the present disclosure. In examples, FIGS. 13A-13K illustrate an impact of maintaining minimum lateral clearance from surrounding static objects as a kinematic factor with a competing impact of maintaining minimum lateral clearance from surrounding dynamic objects as a kinematic factor. FIGS. 13A-13K illustrate various traffic scenarios in which an autonomous vehicle is moving between two objects. In an embodiment, a statistical survey is conducted to indicate which AV operation is more comfortable for the driver/passenger of the autonomous vehicle. The AV operation is related to the determination of a lateral clearance between the autonomous vehicle and either object. Generally, being in the center of two objects (i.e., centrality) is preferable (e.g., causes higher passenger comfort) for the driver/passenger. However, if the two objects have different danger ratings, the driver/passenger may feel more comfortable being closer to an object having a lower danger rating, i.e., the driver/passenger prefers to avoid the more dangerous object. For example, the driver/passenger feels more comfortable if the autonomous vehicle is closer to a static object than a moving or dynamic object.

Figure 13A:
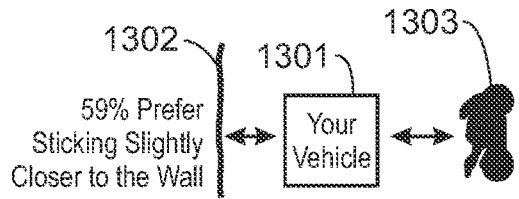
Figure 13B:
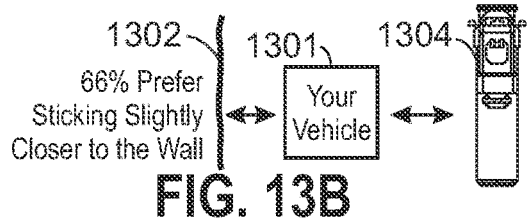
Figure 13C:
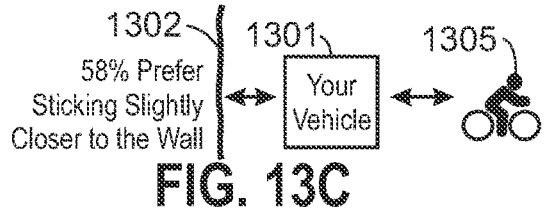

In an embodiment, as shown in FIG. 13A, if an autonomous vehicle 1301 is moving between a wall 1302 (a static object) and a motorcyclist 1303 (a moving or dynamic object), 59% of survey respondents feel more comfortable being closer to the wall 1302. In an embodiment, as shown in FIG. 13B, if the autonomous vehicle 1301 is moving between wall 1302 and a semi-truck 1304, 66% of survey respondents feel more comfortable being closer to wall 1302. In an embodiment, as shown in FIG. 13C, if the autonomous vehicle 1301 is moving between the wall 1302 and a cyclist 1305, 58% of survey respondents feel more comfortable being closer to wall 1302. In an embodiment, as shown in FIG. 13D, if the autonomous vehicle 1301 is moving between bushes 1306 (a static object) and a passenger vehicle 1307 (a moving or dynamic object), 59% of survey respondents feel more comfortable being closer to the bushes 1306. In an embodiment, as shown in FIG. 13E, if the autonomous vehicle 1301 is moving between a curb 1308 and a passenger vehicle 1307, 63% of survey respondents feel more comfortable being closer to the curb 1308. As shown in FIGS. 13A-13E, the survey respondents feel more comfortable if the autonomous vehicle is closer to a static object than a moving or dynamic object, because the static object has a lower danger rating than the vulnerable or intimidating object.

Figure 13F:
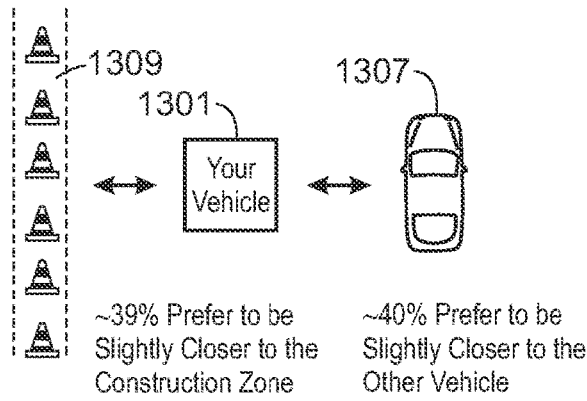
Figure 13D:
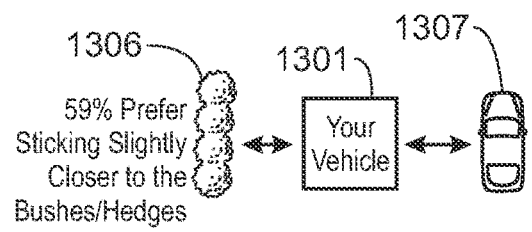
Figure 13E:
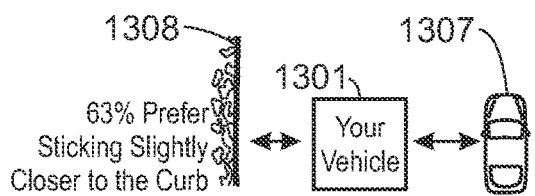

In an embodiment, as shown in FIG. 13F, if the autonomous vehicle 1301 is moving between a construction zone 1309 and the passenger vehicle 1307, 39% of survey respondents feel more comfortable being closer to the construction zone 1309, while 40% of survey respondents feel more comfortable being closer to the passenger vehicle 1307. The construction zone 1309 and the passenger vehicle 1307 have the same danger rating, and thus the survey respondents feel comfortable being closer to either object, or being in the center of the two objects.

Figure 13G:
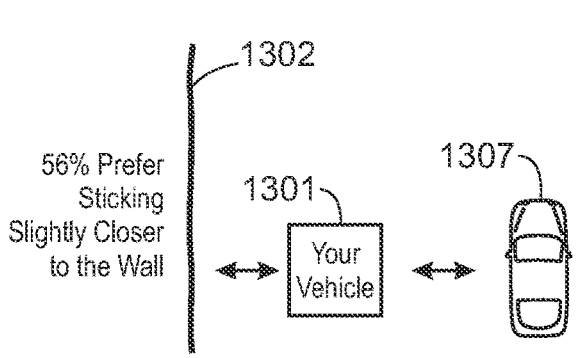

In an embodiment, as shown in FIG. 13G, if the autonomous vehicle 1301 is moving between wall 1302 and the passenger vehicle 1307, 56% of survey respondents feel more comfortable being closer to wall 1302. Wall 1302 has a lower danger rating than the passenger vehicle 1307, but with only one rating scale difference. Thus, only a little higher percentage of survey respondents feel more comfortable being closer to wall 1302. In examples, there is no statistically significant difference between centrality (being in the center of two objects) and avoidance (i.e., avoiding the more dangerous object).

In an embodiment, as shown in FIG. 13H, if the autonomous vehicle 1301 is moving between the pedestrian 1310 and the passenger vehicle 1307, 56% of survey respondents feel more comfortable being closer to the passenger vehicle 1307. In an embodiment, as shown in FIG. 13I, if the autonomous vehicle 1301 is moving between the cyclist 1305 and the passenger vehicle 1307, 52% of survey respondents feel more comfortable being closer to the passenger vehicle 1307. In an embodiment, as shown in FIG. 13J, if the autonomous vehicle 1301 is moving between the pedestrian 1310 and the semi-truck 1304, 43% of survey respondents feel more comfortable being closer to the semi-truck 1304. 43% of survey respondents feel most uncomfortable being closer to the pedestrian 1310. 43% of survey respondents feel most uncomfortable being closer to the semi-truck 1304. In an embodiment, as shown in FIG. 13K, if the autonomous vehicle 1301 is moving between the cyclist 1305 and the semi-truck 1304, 46% of survey respondents feel more comfortable being closer to the semi-truck 1304. 40% of survey respondents feel most uncomfortable being closer to the cyclist 1305. 44% of survey respondents feel most uncomfortable being closer to the semi-truck 1304. As shown in FIGS. 13H-13K, if a vulnerable object is one of the two objects, the comfort preference trends towards a lateral clearance closer to the other object, regardless of the intimidation factor.

Figure 14A:
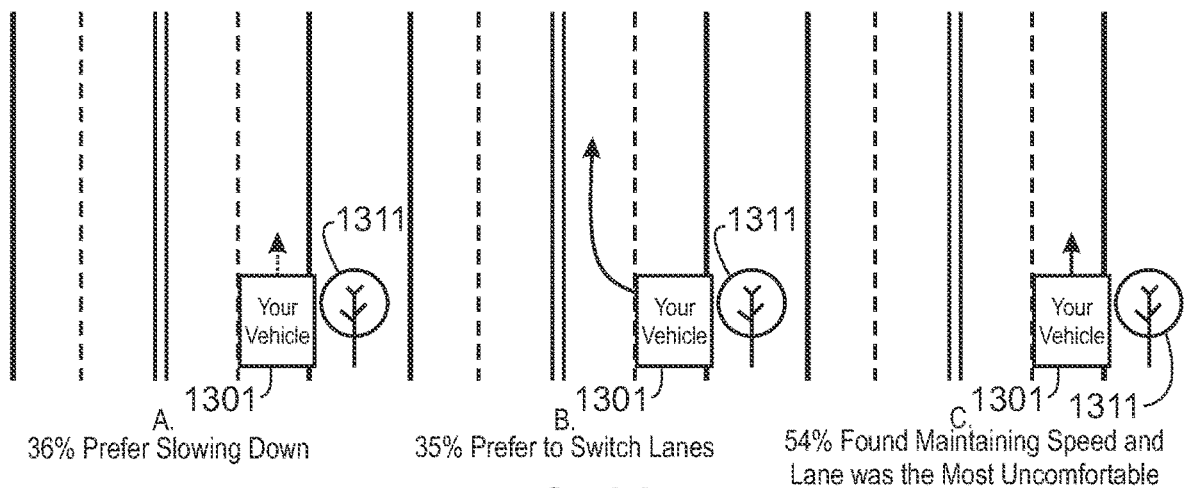
FIGS. 14A-14C are schematic diagrams illustrating various traffic scenarios regarding lateral clearance versus stable longitudinal movement options when encountering static objects in accordance with embodiments.
Figure 14B:
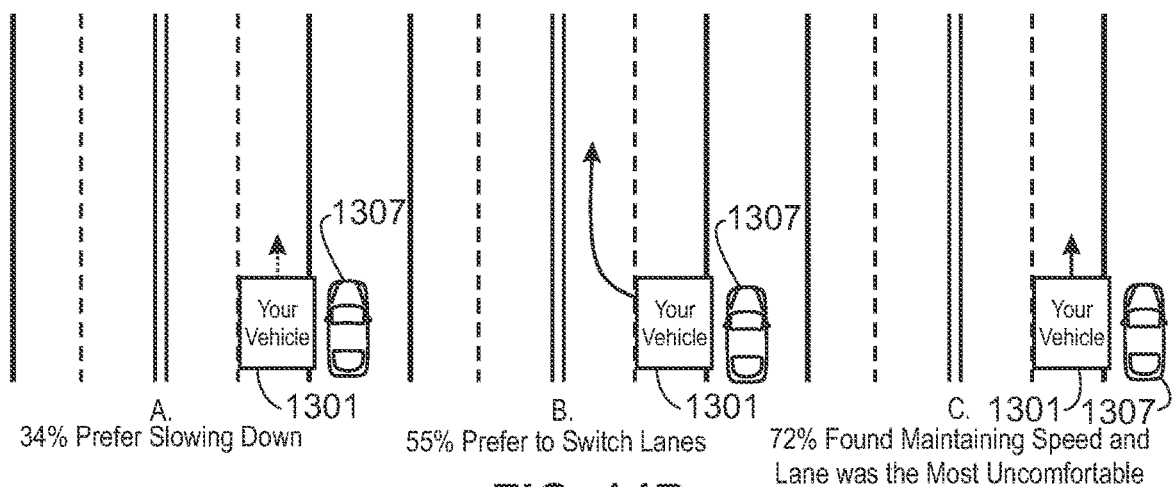
Figure 14C:
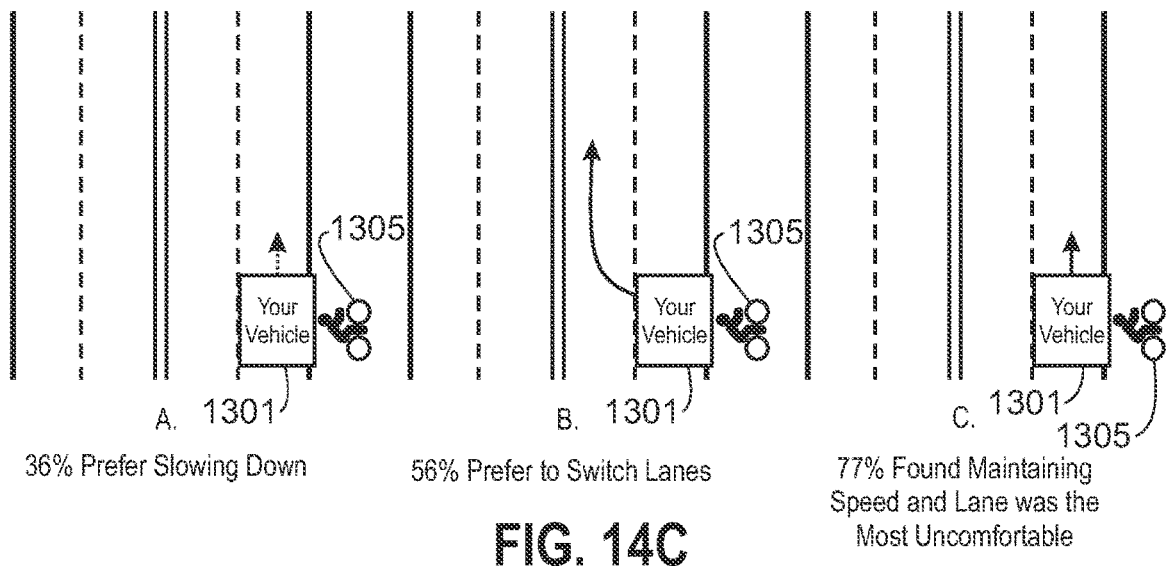

FIGS. 14A-14C are schematic diagrams illustrating various traffic scenarios regarding lateral clearance versus longitudinal velocity options when encountering static objects in accordance with embodiments of the present disclosure. In examples, FIGS. 14A-14C illustrate an impact of maintaining minimum lateral clearance from surrounding static objects as a kinematic factor with a competing impact of longitudinal velocity as a kinematic factor. In examples, a passenger experiences a lower level of comfort as velocity increases when maintaining a minimum lateral clearance with respect to static objects. In an embodiment, as shown in FIG. 14A, if the autonomous vehicle 1301 is moving past a tree 1311, 54% of survey respondents feel most uncomfortable maintaining the current speed and lane (maintain the longitudinal velocity) of the autonomous vehicle 1301. 36% of survey respondents feel more comfortable slowing down (velocity decrease), while 35% of survey respondents feel more comfortable maintaining the current speed and switching to an adjacent lane further away from the tree 1311 (lateral clearance increase). The tree 1311 has a relatively low danger rating. There is no significant statistical difference between slow downing and switching to another lane.

In an embodiment, as shown in FIG. 14B, if the autonomous vehicle 1301 is moving past a passenger vehicle 1307 (e.g., the passenger vehicle 1307 is parking in a lane beside the lane in which the autonomous vehicle 1301 is moving), 72% of survey respondents feel most uncomfortable maintaining the current speed and lane of the autonomous vehicle 1301. 34% of survey respondents feel more comfortable slowing down (velocity decrease), while 55% of survey respondents feel more comfortable switching to an adjacent lane further away from the passenger vehicle 1307 (lateral clearance increase). The passenger vehicle 1307 has a relatively high danger rating, and more survey respondents prefer to maintain the current speed and switch to another lane.

In an embodiment, as shown in FIG. 14C, if the autonomous vehicle 1301 is moving past a cyclist 1305 (the cyclist 1305 stops in a lane beside the lane in which the autonomous vehicle 1301 is moving), 77% of survey respondents feel most uncomfortable maintaining the current speed and lane of the autonomous vehicle 1301. 36% of survey respondents feel more comfortable slowing down (velocity decrease), while 56% of survey respondents feel more comfortable switching to an adjacent lane further away from the cyclist 1305 (lateral clearance increase). The cyclist 1305 has the highest danger rating, and more survey respondents prefer to maintain the current speed and switch to another lane. As shown in FIGS. 14A-14C, it is less comfortable for survey respondents to maintain the current speed and lane when passing a static object. The higher danger rating of the static object, the more comfortable for survey respondents to maintain the current speed and switch to another lane. Most of the survey respondents prefer to switch lanes (lateral clearance increase), instead of increasing the velocity. The faster the AV 1301 is next to a static object, and the more uncomfortable the passenger will be.

Figure 15A:
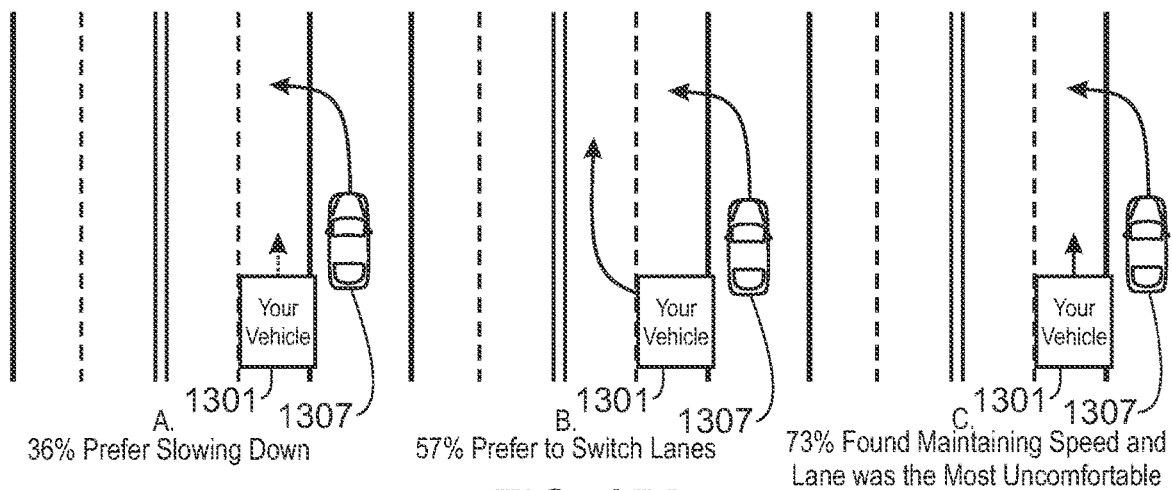
FIGS. 15A-15C are schematic diagrams illustrating various traffic scenarios regarding lateral acceleration versus longitudinal deceleration options when encountering moving or dynamic objects in accordance with embodiments.
Figure 15B:
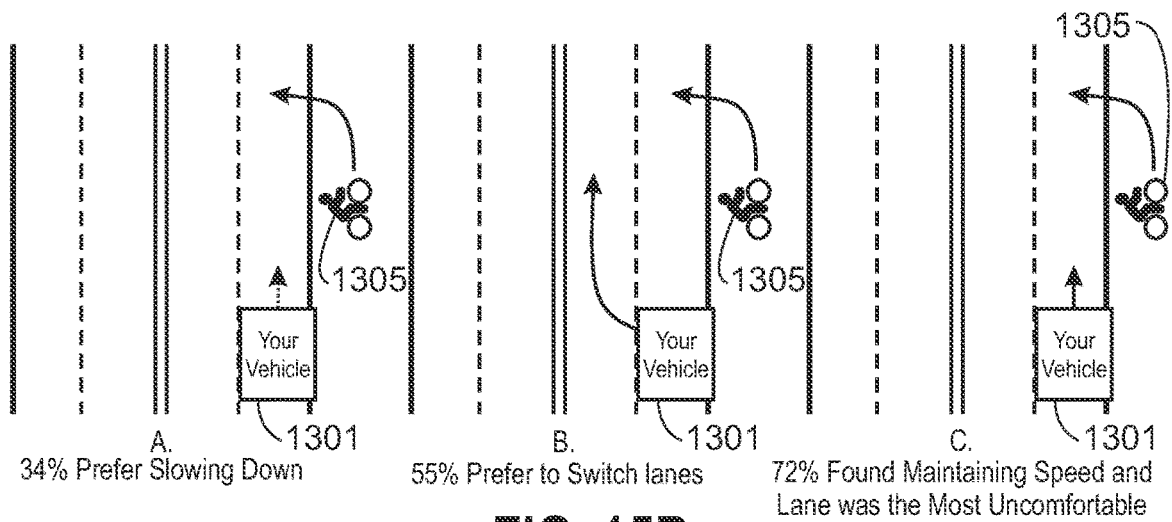
Figure 15C:
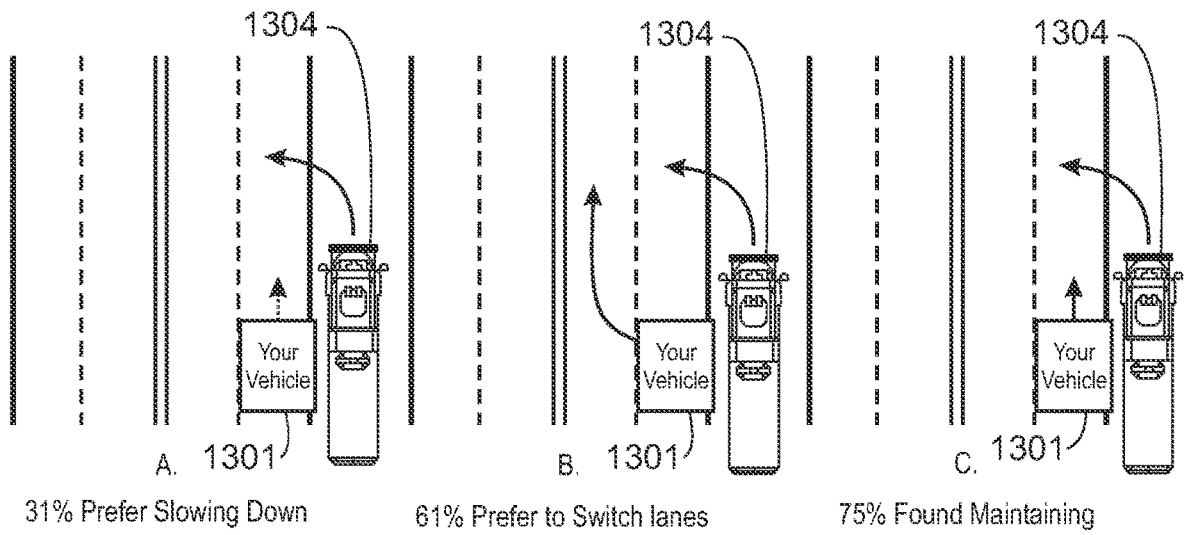

FIGS. 15A-15C are schematic diagrams illustrating various traffic scenarios regarding lateral acceleration versus longitudinal deceleration and lateral clearance versus longitudinal velocity when encountering moving or dynamic objects in accordance with embodiments of the present disclosure. In examples, FIGS. 15A-15C illustrate an impact of lateral acceleration as a kinematic factor with a competing impact of longitudinal deceleration as a kinematic factor. FIGS. 15A-15C also illustrate an impact of lateral clearance as a kinematic factor with a competing impact of longitudinal velocity as a kinematic factor. In examples, a passenger experiences a lower level of comfort as velocity increases when maintaining a lateral clearance with respect to dynamic objects. In an embodiment, as shown in FIG. 15A, if a passenger vehicle 1307 is merging into the lane in which the autonomous vehicle 1301 is moving, 73% of survey respondents feel most uncomfortable maintaining the current speed and lane (stable longitudinal movement) of the autonomous vehicle 1301. 36% of survey respondents feel more comfortable slowing down (velocity decrease), while 57% of survey respondents feel more comfortable maintaining the current speed and switching to an adjacent lane further away from the passenger vehicle 1307 (lateral clearance increase).

In an embodiment, as shown in FIG. 15B, if a cyclist 1305 is merging into the lane in which the autonomous vehicle 1301 is moving, 77% of survey respondents feel most uncomfortable maintaining the current speed and lane of the autonomous vehicle 1301. 37% of survey respondents feel more comfortable slowing down (velocity decrease), while 55% of survey respondents feel more comfortable switching to an adjacent lane further away from the cyclist 1305 (lateral clearance increase).

In an embodiment, as shown in FIG. 15C, if the semi-truck 1304 is merging into the lane in which the autonomous vehicle 1301 is moving, 75% of survey respondents feel most uncomfortable maintaining the current speed and lane of the autonomous vehicle 1301. 31% of survey respondents feel more comfortable slowing down (velocity decrease), while 61% of survey respondents feel more comfortable switching to an adjacent lane further away from the semi-truck 1304 (lateral clearance increase). As shown in FIGS. 15A-15C, moving or dynamic objects are more dangerous than static objects. When a dynamic object merges into the lane in which the autonomous vehicle 1301 is moving, survey respondents prefer to maintain the current speed and switch to another lane, rather than slowing down. This preference to maintain the current speed and switch to another lane is more pronounced when the moving or dynamic object is "intimidating." An overwhelming majority of the survey respondents prefer to react to the moving or dynamic object.

FIGS. 16A-16C are schematic diagrams illustrating various traffic scenarios regarding longitudinal acceleration versus longitudinal deceleration options in accordance with embodiments of the present disclosure. In examples, FIGS. 16A-16C illustrate an impact of longitudinal acceleration as a kinematic factor with a competing impact of longitudinal deceleration as a kinematic factor. In an embodiment, as shown in FIG. 16A, if a passenger vehicle 1307 is merging into the lane in which the autonomous vehicle 1301 is moving, 54% of survey respondents feel least comfortable maintaining the current speed of the autonomous vehicle 1301. 65% of survey respondents feel more comfortable slowing down (longitudinal deceleration), while 22% of survey respondents feel more comfortable speeding up (longitudinal acceleration).

In an embodiment, as shown in FIG. 16B, if a semi-truck 1304 is merging into the lane in which the autonomous vehicle 1301 is moving, 65% of survey respondents feel least comfortable maintaining the current speed of the autonomous vehicle 1301. 54% of survey respondents feel more comfortable slowing down (longitudinal deceleration), while 36% of survey respondents feel more comfortable speeding up (longitudinal acceleration).

In an embodiment, as shown in FIG. 16C, if a cyclist 1305 is merging into the lane in which the autonomous vehicle 1301 is moving, 57% of survey respondents feel least comfortable maintaining the current speed of the autonomous vehicle 1301. 54% of survey respondents feel more comfortable slowing down (longitudinal deceleration), while 35% of survey respondents feel more comfortable speeding up (longitudinal acceleration). As shown in FIGS. 16A-16C, when a moving object is merging into a single lane in which the autonomous vehicle 1301 is moving, the most comfortable option is to slow down and allow the moving object to merge into the lane. When the merging object is more "dangerous," a slightly higher percentage of survey respondents prefer to accelerate.

Figure 17A:
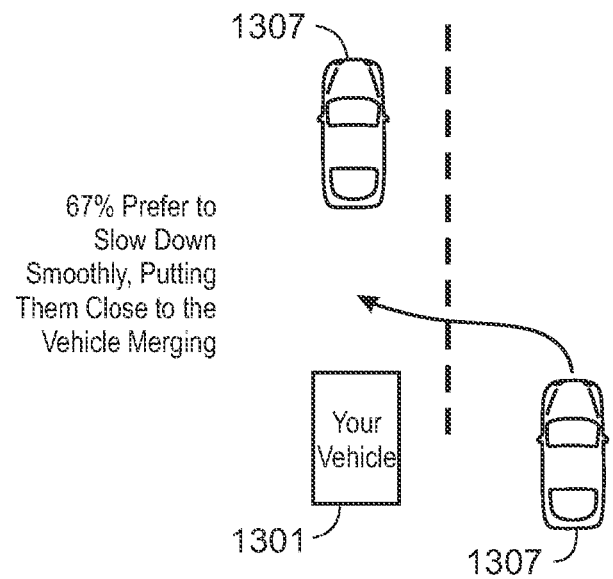
FIGS. 17A-17C are schematic diagrams illustrating various traffic scenarios regarding longitudinal clearance versus longitudinal deceleration (smoothly or jerk) options in accordance with embodiments.
Figure 17B:
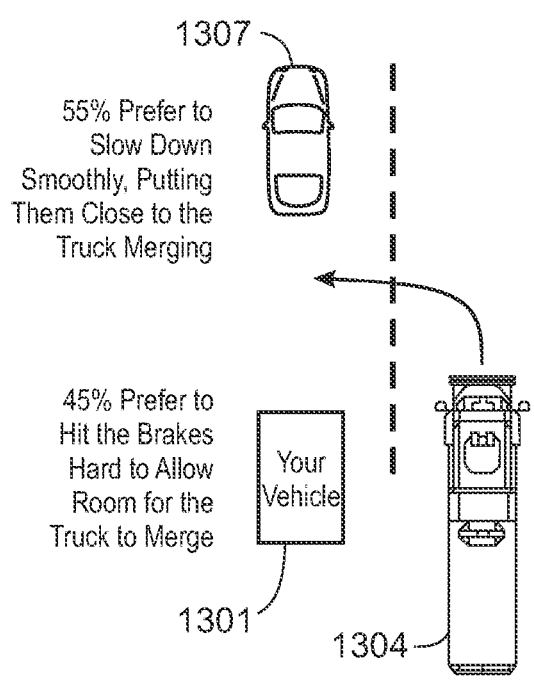
Figure 17C:
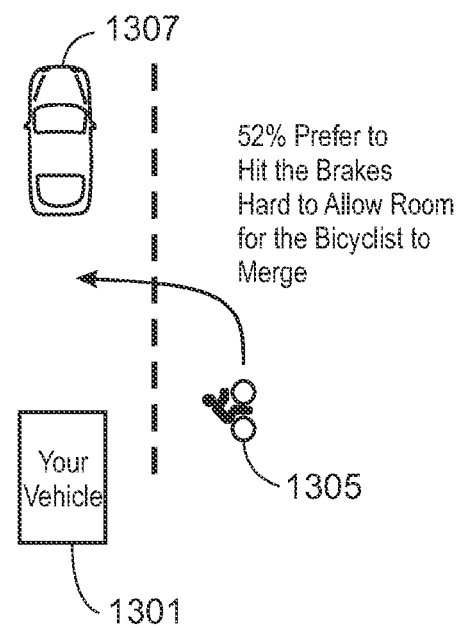

FIGS. 17A-17C are schematic diagrams illustrating various traffic scenarios regarding longitudinal clearance versus longitudinal deceleration (smoothly or jerk) options in accordance with embodiments of the present disclosure. In examples, FIGS. 17A-17C illustrate an impact of minimum longitudinal clearance from surrounding dynamic objects as a kinematic factor with a competing impact of a longitudinal jerk as a kinematic factor. In an embodiment, as shown in FIG. 17A, the autonomous vehicle 1301 is moving in a lane, and a first passenger vehicle 1307 is moving in front of the autonomous vehicle 1301 in the same lane. A second passenger vehicle 1307 is merging between the autonomous vehicle 1301 and the first passenger vehicle 1307. 67% of survey respondents feel more comfortable slowing down smoothly, so that the autonomous vehicle 1301 may be close to the second passenger vehicle 1307 when the second passenger vehicle 1307 is merging. The autonomous vehicle 1301 and the second passenger vehicle 1307 are of similar vehicle type and have the same danger rating, and thus more survey respondents are comfortable not maintaining a following distance (longitudinal clearance), and prefer a smooth ride.

In an embodiment, as shown in FIG. 17B, the autonomous vehicle 1301 is moving in a lane, and a passenger vehicle 1307 is moving in front of the autonomous vehicle 1301 in the same lane. A semi-truck 1304 is merging between the autonomous vehicle 1301 and the passenger vehicle 1307. 55% of survey respondents feel more comfortable slowing down smoothly, so that the autonomous vehicle 1301 may be close to the semi-truck 1304 when the semi-truck 1304 is merging; while 45% of survey respondents feel more comfortable hitting the brake hard (jerk) to allow enough room (longitudinal clearance) for the semi-truck 1304 to merge in. With an intimidating object, a little higher percentage of survey respondents are comfortable with a smooth ride. However, there are also a considerable number of survey respondents that are more comfortable hitting the brake hard to suddenly slow down, so as to provide more room for the intimidating object.

In an embodiment, as shown in FIG. 17C, the autonomous vehicle 1301 is moving in a lane, and a passenger vehicle 1307 is moving in front of the autonomous vehicle 1301 in the same lane. A cyclist 1305 is merging between the autonomous vehicle 1301 and the passenger vehicle 1307. 52% of survey respondents feel more comfortable hitting the brake hard (jerk) to allow enough room (longitudinal clearance) for the cyclist 1305 to merge in. With a vulnerable object, a higher percentage of survey respondents are more comfortable avoiding the vulnerable object, i.e., keeping more distance between the autonomous vehicle 1301 and the vulnerable object.

Figure 18A:
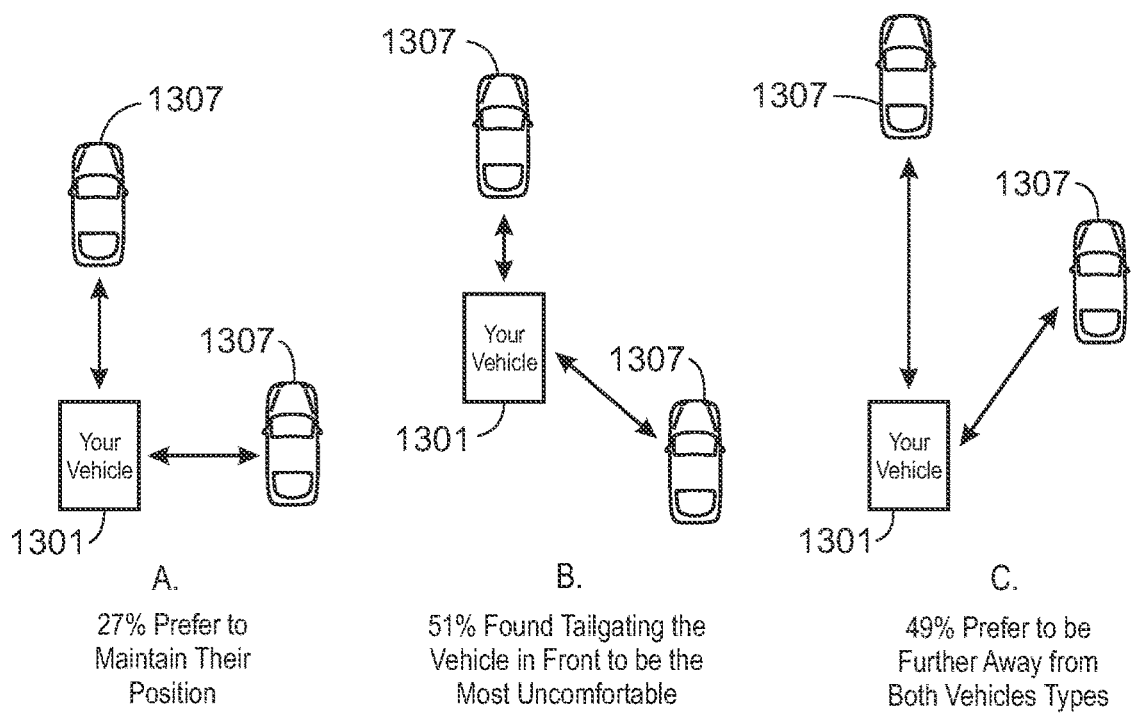
FIGS. 18A-18C are schematic diagrams illustrating various traffic scenarios regarding longitudinal clearance versus lateral clearance options in accordance with embodiments.
Figure 18B:
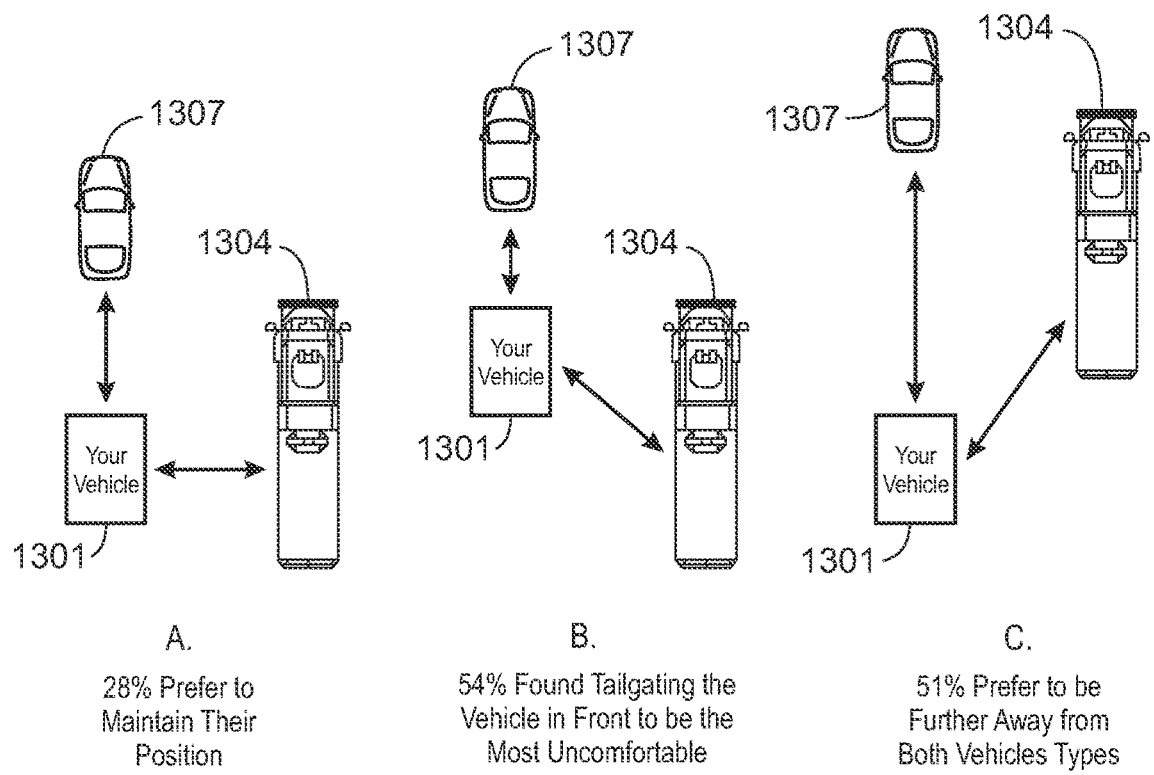
Figure 18C:
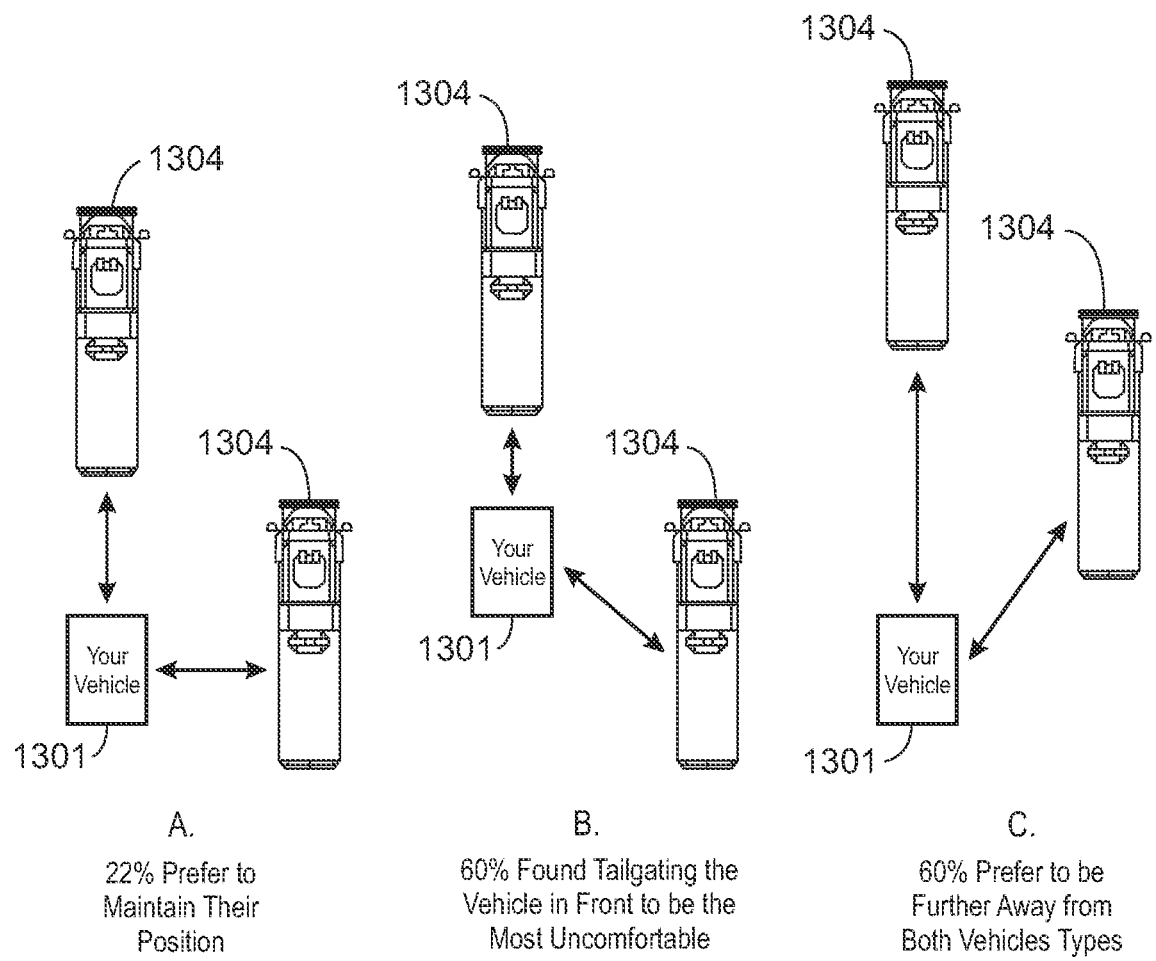

FIGS. 18A-18C are schematic diagrams illustrating various traffic scenarios regarding longitudinal clearance versus lateral clearance options in accordance with embodiments of the present disclosure. In examples, FIGS. 18A-18C illustrate an impact of a minimum longitudinal clearance from surrounding dynamic objects as a kinematic factor with a competing impact of minimum lateral clearance from surrounding dynamic objects as a kinematic factor. In an embodiment, as shown in FIG. 18A, the autonomous vehicle 1301 is moving in a lane, and a first passenger vehicle 1307 is moving in front of the autonomous vehicle 1301 in the same lane. A second passenger vehicle 1307 is moving beside the autonomous vehicle 1301 in an adjacent lane. 51% of survey respondents feel uncomfortable tailgating the first passenger vehicle 1307. 27% of survey respondents prefer to maintain this position, while 49% of survey respondents prefer to be further away from both passenger vehicles (i.e., the first passenger vehicle 1307 and the second passenger vehicle 1307).

In an embodiment, as shown in FIG. 18B, the autonomous vehicle 1301 is moving in a lane, and a passenger vehicle 1307 is moving in front of the autonomous vehicle 1301 in the same lane. A semi-truck 1304 is moving beside the autonomous vehicle 1301 in an adjacent lane. 54% of survey respondents feel uncomfortable tailgating the passenger vehicle 1307. 28% of survey respondents prefer to maintain this position, while 51% of survey respondents prefer to be further away from both vehicles (i.e., the passenger vehicle 1307 and the semi-truck 1304).

In an embodiment, as shown in FIG. 18C, the autonomous vehicle 1301 is moving in a lane, and a first semi-truck 1304 is moving in front of the autonomous vehicle 1301 in the same lane. A second semi-truck 1304 is moving beside the autonomous vehicle 1301 in an adjacent lane. 60% of survey respondents feel uncomfortable tailgating the first semi-truck 1304. 22% of survey respondents prefer to maintain this position, while 60% of survey respondents prefer to be further away from both semi-trucks (i.e., the first semi-truck 1304 and the second semi-truck 1304). As shown in FIGS. 18A-18C, it is more comfortable for survey respondents to stay further away from both vehicles, no matter they are intimidating objects or/and non-intimidating objects. The survey respondents feel less comfortable with semi-trucks or other intimidating objects (intimidating road actors or road agents). The survey respondents feel most uncomfortable when the autonomous vehicle 1301 is tailgating an object, whether the object in front is intimidating or not.

Figure 19A:
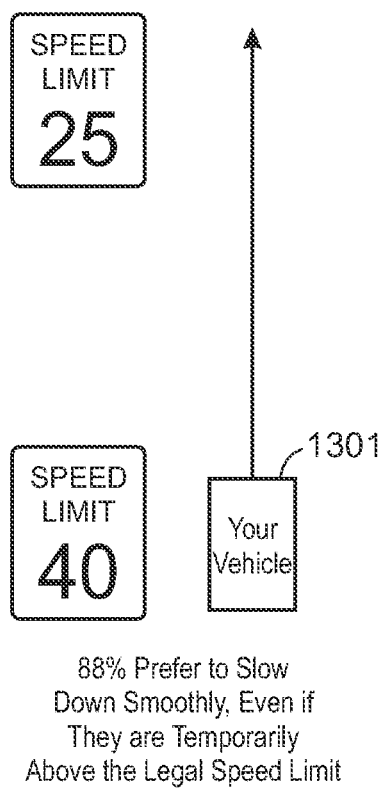
FIGS. 19A-19B are schematic diagrams illustrating two traffic scenarios regarding longitudinal deceleration (smoothly or jerk) due to speed limit changes, in accordance with embodiments.
Figure 19B:
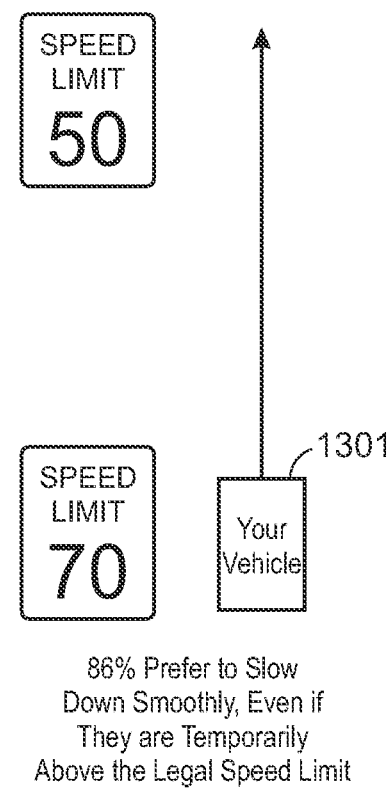

FIGS. 19A-19B are schematic diagrams illustrating two traffic scenarios regarding longitudinal deceleration (smoothly or jerk) versus longitudinal velocity, in accordance with embodiments of the present disclosure. In examples, FIGS. 19A-19B illustrate an impact of a longitudinal jerk as a kinematic factor with a competing impact of longitudinal velocity as a kinematic factor. In examples, a passenger experiences a lower level of comfort if the autonomous vehicle 1301 is moving at a high velocity when jerk occurs. In an embodiment, as shown in FIG. 19A, the autonomous vehicle 1301 is entering into an area with a maximum speed limit of 25 miles/hour from an area with a maximum speed limit of 40 miles/hour. 88% of survey respondents feel more comfortable slowing down smoothly, even if the autonomous vehicle 1301 will be temporarily above 25 miles/hour. However, as shown in FIG. 7, the passenger comfort is a low priority rule compared to abiding by traffic laws (e.g., speed limit violation). In order to follow the traffic law of the speed limit, while still maintaining the ride comfort, the autonomous vehicle 1301 can plan ahead and decrease vehicle speed before it enters the new speed limit zone (25 miles/hour). Thus, the autonomous vehicle 1301 can avoid a longitudinal jerk, thereby maintaining the vehicle's ride smoothness.

In an embodiment, as shown in FIG. 19B, the autonomous vehicle 1301 is entering into an area with a maximum speed limit of 50 miles/hour from an area with a maximum speed limit of 70 miles/hour. 86% of survey respondents feel more comfortable slowing down smoothly, even if the autonomous vehicle 1301 will be temporarily above 50 miles/hour. As shown in FIGS. 19A-19B, if the autonomous vehicle 1301 is subject to a sudden speed limit reduction, the survey respondents are more comfortable slowing down smoothly than braking suddenly, even though the former option will lead to being temporarily above the posted speed limit. However, as shown in FIG. 7, the passenger comfort is a low priority rule compared to abiding by traffic laws (e.g., speed limit violation). In order to follow the traffic law of the speed limit, while still maintaining the ride comfort, the autonomous vehicle 1301 can plan ahead and decrease vehicle speed before it enters the new speed limit zone (25 miles/hour or 50 miles/hour). Thus, the autonomous vehicle 1301 can avoid a longitudinal jerk, thereby maintaining the vehicle's ride smoothness.

Figure 20:
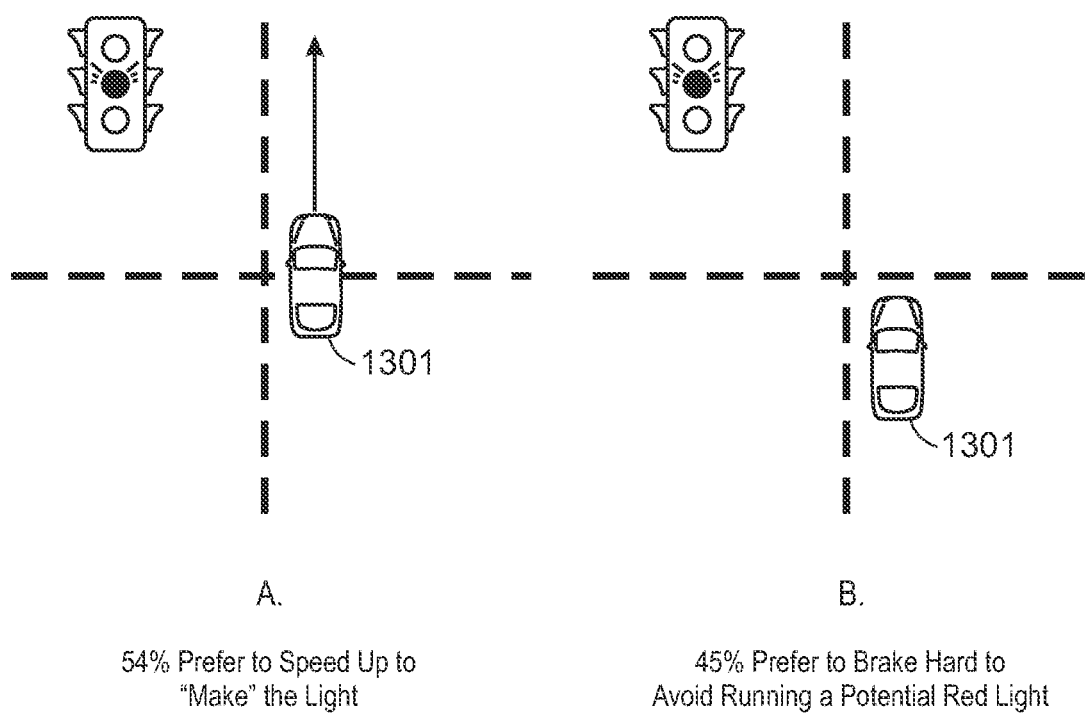
FIG. 20 is a schematic diagram illustrating a traffic scenario regarding acceleration versus deceleration options at an intersection in accordance with embodiments.

FIG. 20 is a schematic diagram illustrating a traffic scenario regarding acceleration versus deceleration options at an intersection in accordance with embodiments of the present disclosure. In examples, FIG. 20 illustrates an impact of longitudinal acceleration as a kinematic factor with a competing impact of a longitudinal jerk as a kinematic factor. In an embodiment, as shown in FIG. 20, the autonomous vehicle 1301 is driving toward an intersection when a yellow traffic light is on. 54% of survey respondents feel more comfortable speeding up to pass through the intersection, while 45% of survey respondents feel more comfortable braking hard to avoid running a potential red light. As shown in FIG. 20, survey respondents feel more comfortable speeding up to pass through the intersection than braking hard to avoid running a potential red light. However, as shown in FIG. 7, the passenger comfort is a low priority rule compared to abiding by traffic laws (e.g., avoid running a red light). In some implementations, in order to follow traffic laws, while still maintaining the ride comfort, the autonomous vehicle 1301 can plan ahead and decrease vehicle speed before it arrives at the intersection. Thus, the autonomous vehicle 1301 can avoid a longitudinal jerk (braking hard) at the intersection, thereby maintaining the vehicle's ride smoothness. In some implementations, the autonomous vehicle 1301 accelerates to pass through the intersection when the yellow light is on, so as to avoid braking hard at the intersection (longitudinal acceleration is preferable to longitudinal jerk).

Figure 21:
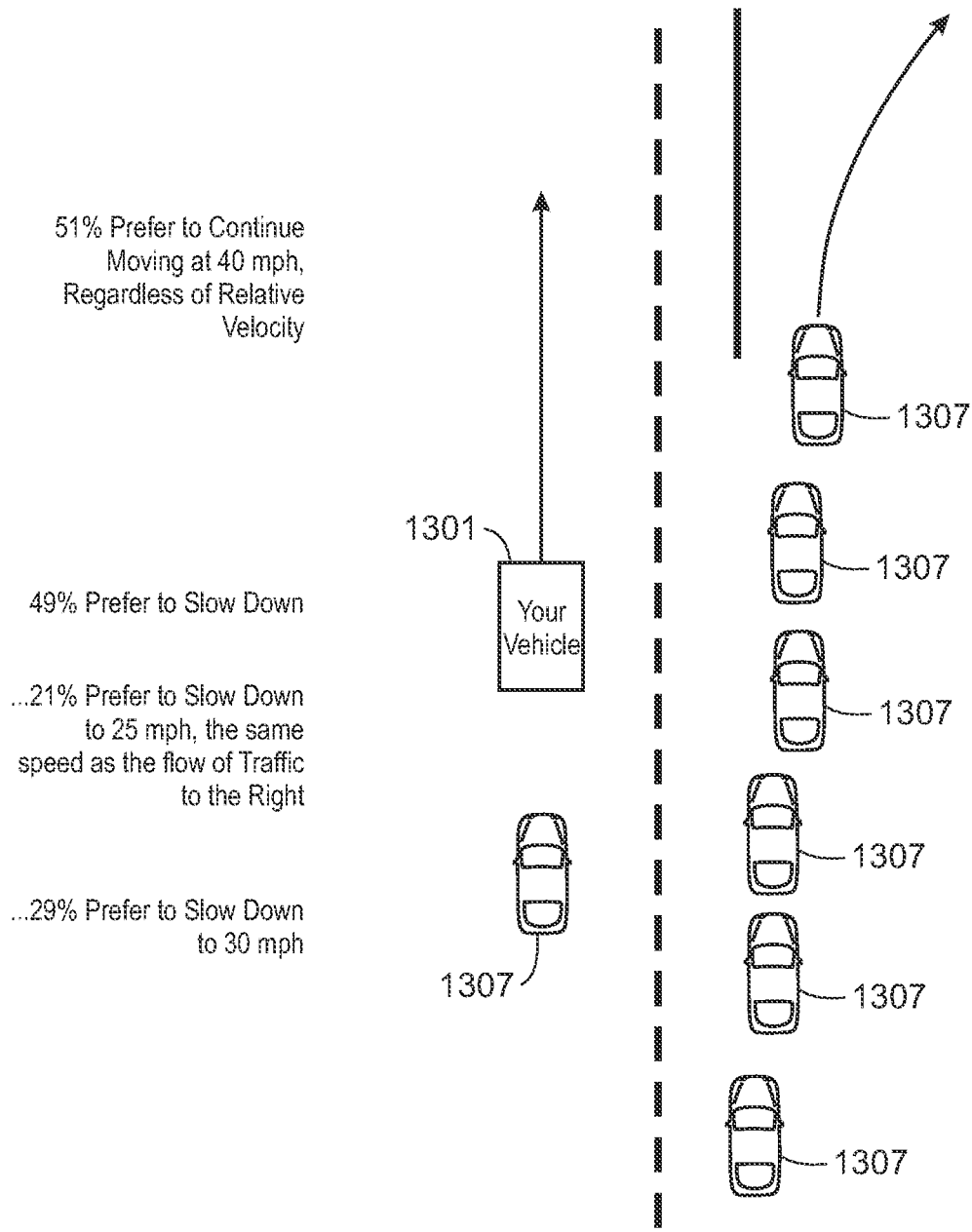
FIG. 21 is a schematic diagram illustrating a traffic scenario regarding relative velocity versus longitudinal velocity options in accordance with embodiments.

FIG. 21 is a schematic diagram illustrating a traffic scenario regarding relative velocity versus longitudinal velocity options in accordance with embodiments of the present disclosure. In examples, FIG. 21 illustrates an impact of relative velocity with respect to surrounding road actors as a kinematic factor, with a competing impact of longitudinal velocity as a kinematic factor. In examples, a passenger experiences a lower level of comfort as velocity increasingly differs from a relative velocity of other vehicles (e.g., the flow of traffic). In an embodiment, as shown in FIG. 21, the autonomous vehicle 1301 is moving at 40 miles per hour in a lane. The autonomous vehicle 1301 is moving past a traffic flow moving at 25 miles per hour in an adjacent lane. 51% of survey respondents feel more comfortable moving past the traffic flow while maintaining the same speed of 40 miles per hour, whilst 49% of survey respondents feel more comfortable slowing down. Among the 49% of survey respondents, 21% of survey respondents prefer to slow down to 25 miles per hour (the same speed as that of the adjacent traffic flow), while 29% of survey respondents prefer to slow down to 30 miles per hour (a little higher speed than that of the adjacent traffic flow). As shown in FIG. 21, survey respondents have divided opinions related to ride comfort when driving past adjacent traffic flow that is moving slower. 51% of survey respondents prefer to move past the traffic flow at the same speed (e.g., 40 miles per hour), regardless of the lower speed of the traffic flow; a nearly equal percentage (49%) of survey respondents prefer to slow down.

Figure 22A:
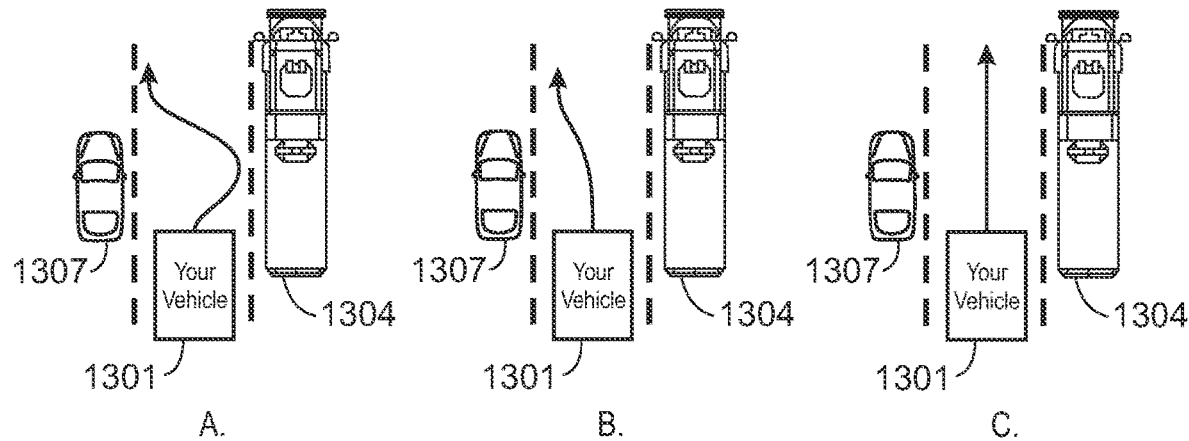
FIGS. 22A-22B are schematic diagrams illustrating two traffic scenarios regarding lateral clearance versus swaying options in accordance with embodiments.
Figure 22B:
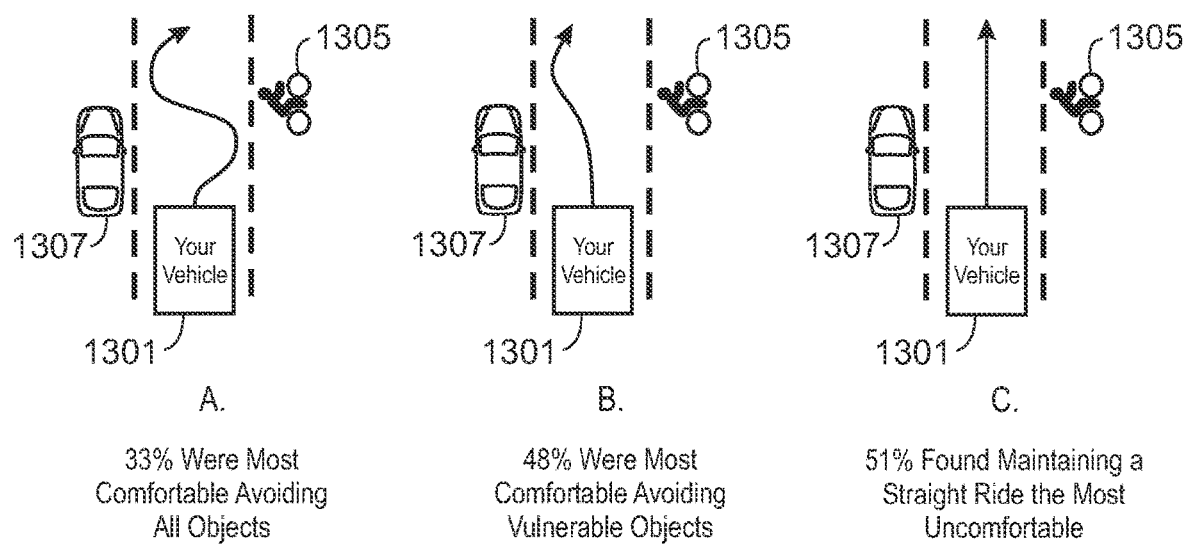

FIGS. 22A-22B are schematic diagrams illustrating two traffic scenarios regarding lateral clearance versus swaying options in accordance with embodiments of the present disclosure. In examples, swaying refers to lateral movement along a lane of travel, where the movement is repetitive, rhythmic, or periodic. In examples, FIGS. 22A-22B illustrates an impact of maintaining lateral clearance as a kinematic factor, with a competing impact of a lateral jerk as a kinematic factor.

In an embodiment, as shown in FIG. 22A, the autonomous vehicle 1301 is moving in a lane between a passenger vehicle 1307 in a left adjacent lane and a semi-truck 1304 in a right adjacent lane. 46% of survey respondents feel most uncomfortable maintaining a smooth straight ride. 51% of survey respondents feel more comfortable avoiding the intimidating object (i.e., semi-truck 1304), while 23% of survey respondents feel more comfortable swaying away from both objects.

In an embodiment, as shown in FIG. 22B, the autonomous vehicle 1301 is moving in a lane between a passenger vehicle 1307 in a left adjacent lane and a cyclist 1305 in a right adjacent lane. 51% of survey respondents feel most uncomfortable maintaining a smooth straight ride. 48% of survey respondents feel more comfortable avoiding the vulnerable object (i.e., cyclist 1305), while 33% of survey respondents feel more comfortable swaying away from both objects. As shown in FIGS. 22A-22B, when the autonomous vehicle 1301 has to drive between two objects (road actors or road agents), most of the survey respondents feel more comfortable avoiding or swaying away from "dangerous" objects (vulnerable objects or intimidating objects), especially the vulnerable object. Most of the survey respondents are least comfortable maintaining a smooth straight ride.

FIGS. 23A-23B are schematic diagrams illustrating a traffic scenario regarding longitudinal jerk versus longitudinal clearance/lateral clearance/longitudinal motion stability in accordance with embodiments of the present disclosure. In examples, FIGS. 23A-23B illustrate an impact of a longitudinal jerk as a kinematic factor, with competing impacts of minimum longitudinal clearance from surrounding dynamic objects, minimum lateral clearance from surrounding dynamic objects, and longitudinal motion stability as kinematic factors. In an embodiment, as shown in FIG. 23A, the autonomous vehicle 1301 is approaching a line of passenger vehicles 1307 (the line of passenger vehicles 1307 move slower than the autonomous vehicle 1301). Another passenger vehicle 1307 is moving in the right adjacent lane, which has a speed limit of 70 miles per hour. 67% of survey respondents feel more comfortable maintaining the speed of the autonomous vehicle 1301 and switching to the right adjacent lane (lateral acceleration), even though the passenger vehicle 1307 is moving at the speed of 70 miles per hour in the right adjacent lane.

In an embodiment, as shown in FIG. 23B, 68% of survey respondents feel more comfortable maintaining the speed of the autonomous vehicle 1301 and switching to the right adjacent lane (lateral acceleration), even though the passenger vehicle 1307 is moving at the speed of 30 miles per hour in the right adjacent lane (the speed limit of the right adjacent lane is 30 miles per hour). As shown in FIGS. 23A-23B, when approaching a line of vehicles moving slower, most of the survey respondents feel more comfortable maintaining speed even when changing lanes. This preference does not change based on the speed of the traffic in the lane to be switched to. Overall, hard braking is perceived as less comfortable by most of the survey respondents.

FIG. 24 is a schematic diagram illustrating operation preferences based on ride comfort in accordance with embodiments of the present disclosure. These operation preferences can be used to resolve tensions between competing interests when it comes to ride comfort. The operation preferences ranking can translate to control parameters and other types of metrics to control the autonomous vehicle (AV) in certain traffic scenarios. The trajectory of the AV can be affected by several factors, such as safety and lawfulness considerations. Ride comfort can be an additional factor to further augment AV trajectory planning.

In an embodiment, lateral acceleration 2401 is a more comfortable option than longitudinal deceleration 2402 for most of the survey respondents. As shown in FIGS. 15A-15C, most of the survey respondents feel more comfortable changing a lane and maintaining the same speed of AV (lateral acceleration 2401) than slowing down smoothly (longitudinal deceleration 2402).

In an embodiment, longitudinal deceleration 2402 is a more comfortable option than longitudinal acceleration 2403 for most of the survey respondents. As shown in FIGS. 16A-16C, most of the survey respondents feel more comfortable slowing down smoothly (longitudinal deceleration 2402) to provide room in front than speeding up (longitudinal acceleration 2403) to give up room behind.

In an embodiment, longitudinal acceleration 2403 is a more comfortable option than longitudinal jerk 2404 for most of the survey respondents. As shown in FIG. 20, most of the survey respondents feel more comfortable speeding up (longitudinal acceleration 2403) to pass through the intersection ("make" the yellow light) than braking hard (longitudinal jerk 2404) to avoid running a potential red light.

Overall, maintaining longitudinal motion stability is more comfortable than sudden changes in a longitudinal direction (longitudinal jerk). Slowing down smoothly is much more comfortable than braking hard to maintain a following distance (unless a safety factor plays a role and a sudden brake is necessary).

FIG. 25 is a schematic diagram illustrating operation preferences based on ride comfort in accordance with embodiments of the present disclosure. In an embodiment, maintaining longitudinal motion stability 2501 (a derived metric) is the most comfortable option. Slowing down smoothly is much more comfortable than braking suddenly to maintain the following distance. As shown in FIGS. 23A-23B, maintaining the speed and switching to the adjacent lane is more comfortable. Hard braking is perceived as less comfortable by most of the survey respondents.

Good following distance (longitudinal clearance) is more important for comfort than good lateral clearance. In an embodiment, larger longitudinal clearance from surrounding dynamic objects 2502 is a more comfortable option than larger lateral clearance from surrounding dynamic objects 2503 for most of the survey respondents. As shown in FIGS. 18A-18C, tailgating the vehicle in front is the most uncomfortable.

In an embodiment, larger lateral clearance from surrounding dynamic objects 2503 is a more comfortable option than larger lateral clearance from surrounding static objects 2504 for most of the survey respondents. As shown in FIGS. 13A-13G, most of the survey respondents feel more comfortable being closer to static objects than dynamic objects, because static objects have a lower danger rating than dynamic objects. Keeping more distance from more dangerous objects is more comfortable than keeping more distance from safer objects.

In an embodiment, larger lateral clearance from surrounding static objects 2504 is a more comfortable option than maintaining the current speed and lane (longitudinal velocity 2505) for most of the survey respondents. As shown in FIGS. 14A-14C, most of the survey respondents feel the most uncomfortable maintaining the current speed and lane. When there is a surrounding static object, most of the survey respondents prefer to stay away from the static object (larger lateral clearance from surrounding static objects 2504).

In an embodiment, larger lateral clearance from surrounding objects (either static objects 2504 or dynamic objects 2503) is a more comfortable option than maintaining the current speed and lane (lateral motion stability 2506) for most of the survey respondents. As shown in FIGS. 22A-22B, most of the survey respondents feel the most uncomfortable maintaining the current speed and lane. Avoiding all road actors (surrounding objects) is more comfortable than not avoiding any road actors at all (lateral motion stability 2506).

Figure 26:
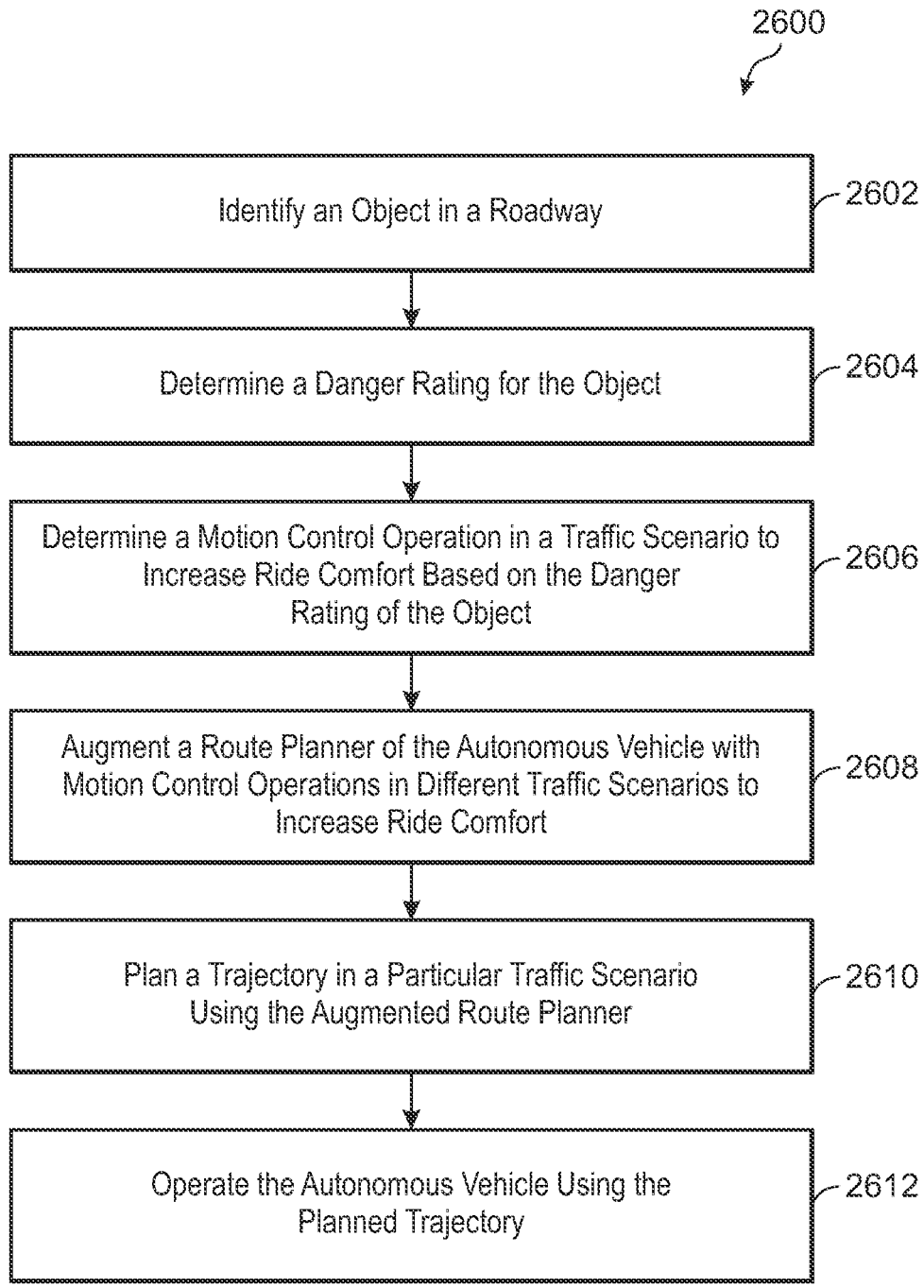
FIG. 26 is a flow diagram illustrating an example process of applying kinematic factors in trajectory planning in accordance with embodiments.

FIG. 26 is a flow diagram illustrating an example process 2600 of applying the kinematic factors in trajectory planning in accordance with embodiments of the present disclosure. A route planner of an AV is used to plan an optimal trajectory for the AV. The route planner can be augmented to account for operations of the AV in various traffic scenarios with regard to ride comfort. The augmented route planner can be used to plan an optimal trajectory in consideration of the kinematic factor, in addition to safety and lawfulness factors and other factors. The AV can be operated using the planned trajectory (using a control circuit or one or more processors of the AV). In some embodiments, process 2600 is implemented (e.g., completely, partially, etc.) using an autonomous system that is the same as or similar to autonomous system 202, described in reference to FIG. 2. In some embodiments, one or more of the steps of process 2600 are performed (e.g., completely, partially, and/or the like) by another device or system, or another group of devices and/or systems that are separate from, or include, the autonomous system. For example, one or more steps of process 2600 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of process 2600 may be performed between any of the above-noted systems in cooperation with one another.

At block 2602, an AV detects an object in a roadway by one or more detecting devices such as cameras 202a, LiDAR sensors 202b, radar sensors 202c, etc. (as shown in FIG. 2).

At block 2604, a danger rating of the object is determined. Referring to FIG. 12, different objects have different danger ratings. The AV can identify what the object is and assign a danger rating accordingly.

At block 2606, the AV determines how to operate the AV in a traffic scenario to increase ride comfort, based on the danger rating of the object. FIGS. 13-25 disclose various traffic scenarios, in which the AV is operated to increase ride comfort in a competing setting.

At block 2608, a route planner of the AV can be augmented with motion control operations in different traffic scenarios to increase ride comfort. For example, various traffic scenarios as shown in FIG. 13-FIG. 25 and the preferred motion control operation for each traffic scenario can be used to augment the route planner, so that the route planner can plan a trajectory in consideration of the kinematic factor.

At block 2610, a trajectory is planned for a particular traffic scenario using the augmented route planner. When the AV is in a particular traffic scenario, the augmented route planner can plan a new trajectory for this particular traffic scenario. The new trajectory is planned based on a plurality of factors, such as safety, lawfulness, as well as ride comfort.

At block 2612, the AV is operated using the planned trajectory. The AV can be operated using the new trajectory. The control circuit (one or more processors) of the AV can operate the AV to move following the new trajectory.

Figure 27:
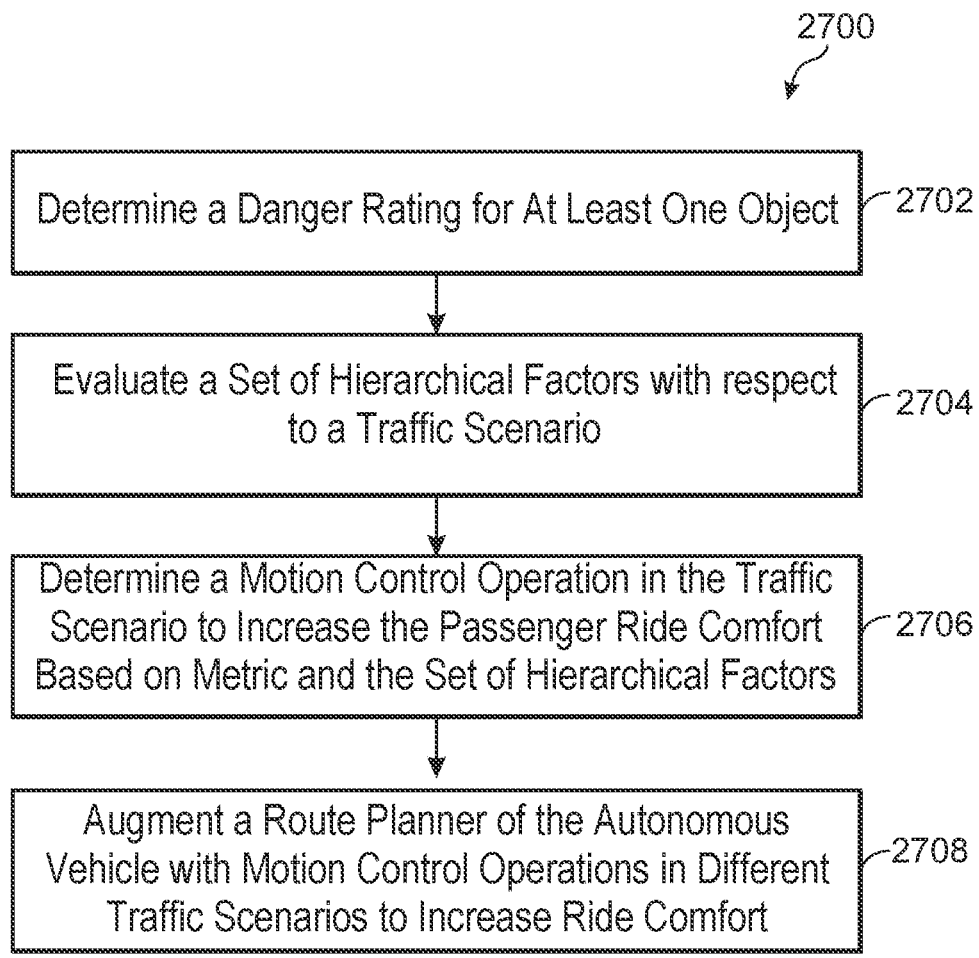
FIG. 27 is a flow diagram illustrating another example process of applying kinematic factors in trajectory planning in accordance with embodiments.

FIG. 27 is a flow diagram illustrating another example process 2700 of applying the kinematic factors in trajectory planning in accordance with embodiments of the present disclosure. In some embodiments, process 2700 is implemented (e.g., completely, partially, etc.) using an autonomous system that is the same as or similar to autonomous system 202, described in reference to FIG. 2. In some embodiments, one or more of the steps of process 2700 are performed (e.g., completely, partially, and/or the like) by another device or system, or another group of devices and/or systems that are separate from, or include, the autonomous system. For example, one or more steps of process 2700 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of process 2700 may be performed between any of the above-noted systems in cooperation with one another.

At block 2702, a danger rating for at least one object identified in a traffic environment is determined. The danger rating represents a perceived risk associated with a respective object. Referring to FIG. 12, different objects have different danger ratings. The AV can identify what the object is and assign a danger rating accordingly.

At block 2704, a set of hierarchical factors (e.g., kinematic factors) with respect to a traffic scenario are identified and evaluated. As shown in FIGS. 24 and 25, the set of hierarchical factors may include but are not limited to: (1) minimum lateral clearance from surrounding static objects (object height dependent); (2) minimum lateral clearance from surrounding dynamic objects (object height dependent); (3) minimum longitudinal clearance from surrounding static objects (object height and object type dependent); (4) minimum longitudinal clearance from surrounding dynamic objects (object height and object type dependent); (5) longitudinal velocity (lateral clearance to static objects dependent); (6) relative velocity with respect to surrounding road actors (lateral clearance to dynamic objects dependent); (7) longitudinal acceleration/longitudinal deceleration (velocity dependent); (8) lateral acceleration/lateral deceleration (velocity dependent); (9) longitudinal jerk; (10) lateral jerk. (11) lateral motion stability and damping (smoothness over time, e.g., avoid swaying); and (12) longitudinal motion stability/damping (smoothness over time, avoid multiple stop/start brake events.

Further, a metric is derived for trajectories of the traffic scenario that quantifies passenger ride comfort based on the danger rating and the set of hierarchical factors. For example, a metric that quantifies passenger ride comfort is derived from the set of hierarchical factors. For example, each kinematic factor is assigned a score to quantify passenger ride comfort, and the scores are taken into account to rank the trajectories.

At block 2706, a motion control operation is determined for the traffic scenario to increase the passenger ride comfort based on the metric. The AV determines how to operate the AV in the traffic scenario to increase ride comfort.

At block 2708, a route planner of the AV can be augmented with motion control operations in different traffic scenarios to increase ride comfort.

According to some non-limiting embodiments or examples, provided is a method, including: determining, using at least one processor, a danger rating for at least one object identified in an environment, wherein the danger rating represents a perceived risk associated with a respective object; evaluating, using the at least one processor, a set of hierarchical factors with respect to a traffic scenario, wherein a metric is derived for trajectories of the traffic scenario that quantifies passenger ride comfort based on the danger rating and the set of hierarchical factors; determining, using the at least one processor, a motion control operation in the traffic scenario to increase the passenger ride comfort based on the metric; and augmenting, using the at least one processor, a route planner of an autonomous vehicle with motion control operations in different traffic scenarios to increase the passenger ride comfort.

According to some non-limiting embodiments or examples, provided is a system, including at least one processor; and a memory storing instructions thereon. When executed by the at least one processor, the instructions cause the at least one processor to perform operations, including: determining a danger rating for at least one object identified in an environment, wherein the danger rating represents a perceived risk associated with a respective object; evaluating a set of hierarchical factors with respect to a traffic scenario, wherein a metric is derived for trajectories of the traffic scenario that quantifies passenger ride comfort based on the danger rating and the set of hierarchical factors; determining a motion control operation in the traffic scenario to increase the passenger ride comfort based on the metric; and augmenting a route planner of an autonomous vehicle with motion control operations in different traffic scenarios to increase the passenger ride comfort.

According to some non-limiting embodiments or examples, provided is at least one non-transitory computer-readable medium including one or more instructions. When executed by at least one processor, the instructions cause the at least one processor to perform operations, including: determining a danger rating for at least one object identified in an environment, wherein the danger rating represents a perceived risk associated with a respective object; evaluating a set of hierarchical factors with respect to a traffic scenario, wherein a metric is derived for trajectories of the traffic scenario that quantifies passenger ride comfort based on the danger rating and the set of hierarchical factors; determining a motion control operation in the traffic scenario to increase the passenger ride comfort based on the metric; and augmenting a route planner of an autonomous vehicle with motion control operations in different traffic scenarios to increase the passenger ride comfort.

Clause 1: A method, comprising: determining, using at least one processor, a danger rating for at least one object identified in an environment, wherein the danger rating represents a perceived risk associated with a respective object; evaluating, using the at least one processor, a set of hierarchical factors with respect to a traffic scenario, wherein a metric is derived for trajectories of the traffic scenario that quantifies passenger ride comfort based on the danger rating and the set of hierarchical factors; determining, using the at least one processor, a motion control operation in the traffic scenario to increase the passenger ride comfort based on the metric; and augmenting, using the at least one processor, a route planner of an autonomous vehicle with motion control operations in different traffic scenarios to increase the passenger ride comfort.

Clause 2: The method of clause 1, further comprising: selecting, using the at least one processor, a trajectory in a particular traffic scenario using the augmented route planner, wherein the selected trajectory comprises a highest metric when compared to metrics of the trajectories of the traffic scenario; and operating, using the at least one processor, the autonomous vehicle using the selected trajectory.

Clause 3: The method of clauses 1 or 2, wherein a danger rating of a vulnerable object or an intimidating object is higher than a danger rating of a static object.

Clause 4: The method of any of clauses 1-3, wherein determining the motion control operation in the traffic scenario further comprises: detecting, using the at least one processor, one object on a left side of the autonomous vehicle and another object on a right side of the autonomous vehicle, wherein the two objects have different danger ratings; and moving, using the at least one processor, the autonomous vehicle closer to an object with a lower danger rating when the autonomous vehicle is between the two objects.

Clause 5: The method of any of clauses 1-4, wherein determining the motion control operation in the traffic scenario further comprises: detecting, using the at least one processor, one object on a left side of the autonomous vehicle and another object on a right side of the autonomous vehicle, wherein the two objects have a same danger rating; and moving, using the at least one processor, the autonomous vehicle closer to either of the two objects or in a center of the two objects when the autonomous vehicle is between the two objects.

Clause 6: The method of any of clauses 1-5, wherein determining the motion control operation in the traffic scenario further comprises: detecting, using the at least one processor, a static object beside the autonomous vehicle, wherein the static object has a lower danger rating than the autonomous vehicle; and moving, using the at least one processor, the autonomous vehicle away from the static object.

Clause 7: The method of clause 6, wherein moving the autonomous vehicle away from the static object further comprises: slowing down, using the at least one processor, the autonomous vehicle or switching the autonomous vehicle to another lane.

Clause 8: The method of any of clauses 1-7, wherein determining the motion control operation in the traffic scenario further comprises: switching, using the at least one processor, the autonomous vehicle to another lane when the autonomous vehicle is adjacent to a moving object.

Clause 9: The method of any of clauses 1-8, wherein determining the motion control operation in the traffic scenario further comprises: slowing down, using the at least one processor, the autonomous vehicle when a moving object is merging into a lane in which the autonomous vehicle is moving.

Clause 10: The method of any of clauses 1-9, wherein determining the motion control operation in the traffic scenario further comprises: slowing down, using the at least one processor, the autonomous vehicle smoothly when a moving object is merging into a lane in which the autonomous vehicle is moving, wherein the autonomous vehicle and the moving object have a same danger rating.

Clause 11: The method of any of clauses 1-10, wherein determining the motion control operation in the traffic scenario further comprises: slowing down, using the at least one processor, the autonomous vehicle suddenly when a vulnerable object is merging into a lane in which the autonomous vehicle is moving.

Clause 12: The method of any of clauses 1-11, wherein determining the motion control operation in the traffic scenario further comprises: moving, using the at least one processor, the autonomous vehicle away from two moving objects when one moving object is moving before the autonomous vehicle and the other moving object is moving beside the autonomous vehicle.

Clause 13: The method of any of clauses 1-12, wherein determining the motion control operation in the traffic scenario further comprises: slowing down, using the at least one processor, the autonomous vehicle smoothly when the autonomous vehicle is subject to a speed limit decrease.

Clause 14: The method of any of clauses 1-13, wherein determining the motion control operation in the traffic scenario further comprises: detecting, using the at least one processor, an upcoming yellow traffic light at an intersection; and speeding up, using the at least one processor, the autonomous vehicle to go through the yellow traffic light when the autonomous vehicle is moving toward the intersection and the yellow traffic light is on.

Clause 15: The method of any of clauses 1-14, wherein determining the motion control operation in the traffic scenario further comprises: maintaining, using the at least one processor, a speed of the autonomous vehicle or slowing down the autonomous vehicle when the autonomous vehicle is moving faster than a plurality of moving objects in an adjacent lane.

Clause 16: The method of any of clauses 1-15, wherein determining the motion control operation in the traffic scenario further comprises: moving, using the at least one processor, the autonomous vehicle to avoid a moving object with a higher danger rating when the autonomous vehicle is between two moving objects having different danger ratings.

Clause 17: The method of any of clauses 1-16, wherein determining the motion control operation in the traffic scenario further comprises: switching, using the at least one processor, the autonomous vehicle to an adjacent lane and maintaining a same speed, when the autonomous vehicle is approaching a plurality of moving objects.

Clause 18: A system comprising: at least one processor; and a memory storing instructions thereon. When executed by the at least one processor, the instructions cause the at least one processor to perform operations, comprising: determining a danger rating for at least one object identified in an environment, wherein the danger rating represents a perceived risk associated with a respective object; evaluating a set of hierarchical factors with respect to a traffic scenario, wherein a metric is derived for trajectories of the traffic scenario that quantifies passenger ride comfort based on the danger rating and the set of hierarchical factors; determining a motion control operation in the traffic scenario to increase the passenger ride comfort based on the metric; and augmenting a route planner of an autonomous vehicle with motion control operations in different traffic scenarios to increase the passenger ride comfort.

Clause 19: A non-transitory, computer-readable storage medium having instructions stored thereon. When executed by at least one processor, the instructions cause the at least one processor to perform operations, comprising: determining a danger rating for at least one object identified in an environment, wherein the danger rating represents a perceived risk associated with a respective object; evaluating a set of hierarchical factors with respect to a traffic scenario, wherein a metric is derived for trajectories of the traffic scenario that quantifies passenger ride comfort based on the danger rating and the set of hierarchical factors; determining a motion control operation in the traffic scenario to increase the passenger ride comfort based on the metric; and augmenting a route planner of an autonomous vehicle with motion control operations in different traffic scenarios to increase the passenger ride comfort.

Clause 20: The computer-readable storage medium of clause 19, wherein a danger rating of a vulnerable object or an intimidating object is higher than a danger rating of a static object.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    determining, using at least one processor, a danger rating associated with each of objects identified in an environment, wherein the danger rating represents a level of severity of damage caused by a respective object if a collision were to occur, and wherein a danger rating associated with an intimidating object is the same as a danger rating associated with a vulnerable object, and a danger rating associated with a passenger vehicle is the same as a danger rating associated with a construction zone;
    evaluating, using the at least one processor, a set of hierarchical factors with respect to one or more traffic scenarios;
    determining a metric for trajectories of each traffic scenario that quantifies passenger ride comfort based on the danger rating associated with each of the objects identified in the environment and the set of hierarchical factors;
    determining, using the at least one processor, a motion control operation in each traffic scenario to increase the passenger ride comfort based on the metric;
    augmenting, using the at least one processor, a route planner of an autonomous vehicle with motion control operations in the one or more traffic scenarios to increase the passenger ride comfort;
    selecting, using the at least one processor, a trajectory in a particular traffic scenario using the augmented route planner, wherein the selected trajectory comprises a highest metric when compared to metrics of the trajectories of the particular traffic scenario; and
    operating, using the at least one processor, the autonomous vehicle using the selected trajectory.

2. The method of claim 1, wherein the danger rating associated with the vulnerable object or the intimidating object is higher than a danger rating of a static object.

3. The method of claim 1, wherein determining the motion control operation in each traffic scenario further comprises:
    detecting, using the at least one processor, one object on a left side of the autonomous vehicle and another object on a right side of the autonomous vehicle, wherein the two objects have different danger ratings; and
    moving, using the at least one processor, the autonomous vehicle, so that the autonomous vehicle is closer to an object with a lower danger rating than the other object with a higher danger rating when the autonomous vehicle is between the two objects.

4. The method of claim 1, wherein determining the motion control operation in each traffic scenario further comprises:
    detecting, using the at least one processor, one object on a left side of the autonomous vehicle and another object on a right side of the autonomous vehicle, wherein the two objects have a same danger rating; and
    moving, using the at least one processor, the autonomous vehicle in a center of the two objects when the autonomous vehicle is between the two objects.

5. The method of claim 1, wherein determining the motion control operation in each traffic scenario further comprises:
    detecting, using the at least one processor, a static object beside the autonomous vehicle, wherein the static object has a lower danger rating than the autonomous vehicle; and
    moving, using the at least one processor, the autonomous vehicle away from the static object.

6. The method of claim 5, wherein moving the autonomous vehicle away from the static object further comprises:
    slowing down, using the at least one processor, the autonomous vehicle or switching the autonomous vehicle to another lane.

7. The method of claim 1, wherein determining the motion control operation in each traffic scenario further comprises:
    switching, using the at least one processor, the autonomous vehicle to another lane when the autonomous vehicle is adjacent to a moving object.

8. The method of claim 1, wherein determining the motion control operation in each traffic scenario further comprises:
    slowing down, using the at least one processor, the autonomous vehicle when a moving object is merging into a lane in which the autonomous vehicle is moving.

9. The method of claim 1, wherein determining the motion control operation in each traffic scenario further comprises:
    slowing down, using the at least one processor, the autonomous vehicle smoothly when a moving object is merging into a lane in which the autonomous vehicle is moving, wherein the autonomous vehicle and the moving object have a same danger rating.

10. The method of claim 1, wherein determining the motion control operation in each traffic scenario further comprises:
    slowing down, using the at least one processor, the autonomous vehicle suddenly when the vulnerable object is merging into a lane in which the autonomous vehicle is moving.

11. The method of claim 1, wherein determining the motion control operation in each traffic scenario further comprises:
    moving, using the at least one processor, the autonomous vehicle away from two moving objects when one moving object is moving before the autonomous vehicle and the other moving object is moving beside the autonomous vehicle.

12. The method of claim 1, wherein determining the motion control operation in each traffic scenario further comprises:
slowing down, using the at least one processor, the autonomous vehicle smoothly when the autonomous vehicle is subject to a speed limit decrease.

13. The method of claim 1, wherein determining the motion control operation in each traffic scenario further comprises:
detecting, using the at least one processor, an upcoming yellow traffic light at an intersection; and
speeding up, using the at least one processor, the autonomous vehicle to go through the yellow traffic light when the autonomous vehicle is moving toward the intersection and the yellow traffic light is on.

14. The method of claim 1, wherein determining the motion control operation in each traffic scenario further comprises:
maintaining, using the at least one processor, a speed of the autonomous vehicle or slowing down the autonomous vehicle when the autonomous vehicle is moving faster than a plurality of moving objects in an adjacent lane.

15. The method of claim 1, wherein determining the motion control operation in each traffic scenario further comprises:
moving, using the at least one processor, the autonomous vehicle to avoid a moving object with a higher danger rating when the autonomous vehicle is between two moving objects having different danger ratings.

16. The method of claim 1, wherein the set of hierarchical factors comprise lateral acceleration, longitudinal deceleration, longitudinal acceleration, and longitudinal jerk, and the passenger ride comfort associated with each hierarchical factor is in an order from high to low.

17. The method of claim 1, wherein determining the motion control operation in each traffic scenario further comprises:
switching, using the at least one processor, the autonomous vehicle to an adjacent lane and maintaining a same speed, when the autonomous vehicle is approaching a plurality of moving objects.

18. A system comprising:
at least one processor; and
a memory storing instructions thereon that, when executed by the at least one processor, cause the at least one processor to perform operations, comprising:
determining a danger rating associated with each of objects identified in an environment, wherein the danger rating represents a level of severity of damage caused by a respective object if a collision were to occur, and wherein a danger rating associated with an intimidating object is the same as a danger rating associated with a vulnerable object, and a danger rating associated with a passenger vehicle is the same as a danger rating associated with a construction zone;
evaluating a set of hierarchical factors with respect to one or more traffic scenarios;
determining a metric for trajectories of each traffic scenario that quantifies passenger ride comfort based on the danger rating associated with each of the objects identified in the environment and the set of hierarchical factors;
determining a motion control operation in each traffic scenario to increase the passenger ride comfort based on the metric;
augmenting a route planner of an autonomous vehicle with motion control operations in the one or more traffic scenarios to increase the passenger ride comfort;
selecting, using the at least one processor, a trajectory in a particular traffic scenario using the augmented route planner, wherein the selected trajectory comprises a highest metric when compared to metrics of the trajectories of the particular traffic scenario; and
operating, using the at least one processor, the autonomous vehicle using the selected trajectory.

19. A non-transitory, computer-readable storage medium having instructions stored thereon, that when executed by at least one processor, cause the at least one processor to perform operations, comprising:
determining a danger rating associated with each of objects identified in an environment, wherein the danger rating represents a level of severity of damage caused by a respective object if a collision were to occur, and wherein a danger rating associated with an intimidating object is the same as a danger rating associated with a vulnerable object, and a danger rating associated with a passenger vehicle is the same as a danger rating associated with a construction zone;
evaluating a set of hierarchical factors with respect to one or more traffic scenarios;
determining a metric for trajectories of each traffic scenario that quantifies passenger ride comfort based on the danger rating associated with each of the objects identified in the environment and the set of hierarchical factors;
determining a motion control operation in each traffic scenario to increase the passenger ride comfort based on the metric;
augmenting a route planner of an autonomous vehicle with motion control operations in the one or more traffic scenarios to increase the passenger ride comfort;
selecting, using the at least one processor, a trajectory in a particular traffic scenario using the augmented route planner, wherein the selected trajectory comprises a highest metric when compared to metrics of the trajectories of the particular traffic scenario; and
operating, using the at least one processor, the autonomous vehicle using the selected trajectory.

20. The computer-readable storage medium of claim 19, wherein the danger rating associated with the vulnerable object or the intimidating object is higher than a danger rating of a static object.

* * * * *